United States Patent [19]
McNabb

[11] Patent Number: 5,927,603
[45] Date of Patent: Jul. 27, 1999

[54] CLOSED LOOP CONTROL SYSTEM, SENSING APPARATUS AND FLUID APPLICATION SYSTEM FOR A PRECISION IRRIGATION DEVICE

[75] Inventor: Gerald J. McNabb, Pocatello, Id.

[73] Assignee: J. R. Simplot Company, Pocatello, Id.

[21] Appl. No.: 08/941,863

[22] Filed: Sep. 30, 1997

[51] Int. Cl.⁶ .............................. A01G 25/00; B67D 5/08
[52] U.S. Cl. ............................... 239/63; 239/69; 239/71; 239/74; 239/728
[58] Field of Search .................................. 239/63, 67, 69, 239/71, 74, 722, 723, 728, DIG. 15

[56] References Cited

U.S. PATENT DOCUMENTS

| Re. 31,023 | 9/1982 | Hall, III | 47/1 R |
| 3,803,570 | 4/1974 | Barlow et al. | 340/235 |
| 4,015,366 | 4/1977 | Hall, III | 47/1 R |

(List continued on next page.)

FOREIGN PATENT DOCUMENTS

| 202847 | 11/1986 | European Pat. Off. | 239/728 |
| 423438 | 4/1974 | U.S.S.R. | 239/728 |

OTHER PUBLICATIONS

"Terminology!", *Business Geographics*, Jul./Aug. 1995, p. 8.
*GPS World Magazine*, Jun. 1995, cover page and p. 4.
*GIM International Journal for Geomatics*, the 100th edition of GIM, cover page and editorial page.
*GIS World*, Jul. 1995, cover page and p. 10.
"Irrigation by the inch", *Farm Journal*, Sep. 1995, cover sheet and p. A–2.
"Precision Agriculture: Will It Change the Way You Market?", *Ag Retailer*, Mar. 1995, pp. 52, 54–55.
"ArcView for Agriculture" and "ESRI GIS Solutions for Agriculture" (advertisements).

(List continued on next page.)

*Primary Examiner*—Andres Kashnikow
*Assistant Examiner*—Robin O. Evans
*Attorney, Agent, or Firm*—Wells, St. John, Roberts, Gregory & Matkin, P.S.

[57] ABSTRACT

An automatic irrigation system includes a movable irrigation device having a fluid delivery nozzle and a fluid manifold positioned along the mobile irrigation device and adapted to receive irrigation fluid from a supply source. The system includes a detector of moisture present within an agricultural field including an output on which signals representing the detected moisture level are placed. The system also includes an electronic storage device having an addressing and reproduction unit that can selectively address and reproduce a plurality of stored command signals. The system also includes first electronic circuitry coupled to the storage device and including an input for command control signals reproduced from the storage device. The electronic circuitry applies the reproduced command control signal to cause the detector to detect moisture from a plurality of different locations within an agricultural field. A second electronic circuitry compares the detected moisture level at each location within the agricultural field with the reproduced command control signals to ascertain whether the moisture level matches the moisture level indicated by the command control signals. One of the first and the second electronic circuitry produces signals for controlling the fluid nozzle in response to the feedback signal from the detector to impart a desired application of irrigation fluid to the agricultural field. Another embodiment includes a sprinkler for an irrigation system having a fluid nozzle and a fluid flow sensor for detecting fluid flow from the nozzle.

27 Claims, 12 Drawing Sheets

U.S. PATENT DOCUMENTS

| | | | |
|---|---|---|---|
| 4,186,880 | 2/1980 | Jacobi et al. | 239/177 |
| 4,197,866 | 4/1980 | Neal | 137/1 |
| 4,249,698 | 2/1981 | Smith et al. | 239/1 |
| 4,396,149 | 8/1983 | Hirsch | 239/71 X |
| 4,569,481 | 2/1986 | Davis et al. | 239/177.2 |
| 4,662,563 | 5/1987 | Wolfe | 239/728 X |
| 4,683,904 | 8/1987 | Iltis | 137/78.3 |
| 4,693,419 | 9/1987 | Weintraub et al. | 239/63 |
| 4,852,802 | 8/1989 | Iggulden et al. | 239/64 |
| 5,060,859 | 10/1991 | Bancroft | 239/64 |
| 5,097,861 | 3/1992 | Hopkins et al. | 137/78.3 |
| 5,176,320 | 1/1993 | Kraus et al. | 239/2.2 |
| 5,193,744 | 3/1993 | Goldstein | 239/69 |
| 5,246,164 | 9/1993 | McCann et al. | 239/11 |
| 5,278,749 | 1/1994 | De Man | 364/143 |
| 5,337,957 | 8/1994 | Olson | 239/63 |
| 5,341,831 | 8/1994 | Zur | 137/78.3 |
| 5,478,013 | 12/1995 | Ballu | 239/71 |
| 5,847,568 | 12/1998 | Stashkiw et al. | 239/63 X |

OTHER PUBLICATIONS

"Make Way for Site–Specific", *Farm Chemicals*, p. 20.

"Start Making Sense", by D.D. Francis and J.S. Schepers, *Farm Chemicals*, mid–Mar. 1997, pp. 20, 22.

"Can Computers Help Grow Quality Crops?" by Gary Rawlings (Ed.), *Potato Grower*, Mar. 1997, pp. 42–43.

"The Steering Wheel for Your Irrigation", EnviroSCAN, advertisement by Sentek PTY LTD, Adelaide, South Australia.

"Would you drive a tractor without a steering wheel . . . ", EnviroSCAN, advertisement by Sentek PTY LTD, Adelaide, South Australia.

"EnviroSCAN—The Soil Water Continuous Monitoring System", 1994 brochure by Sentek PTY LTD, Adelaide, South Australia.

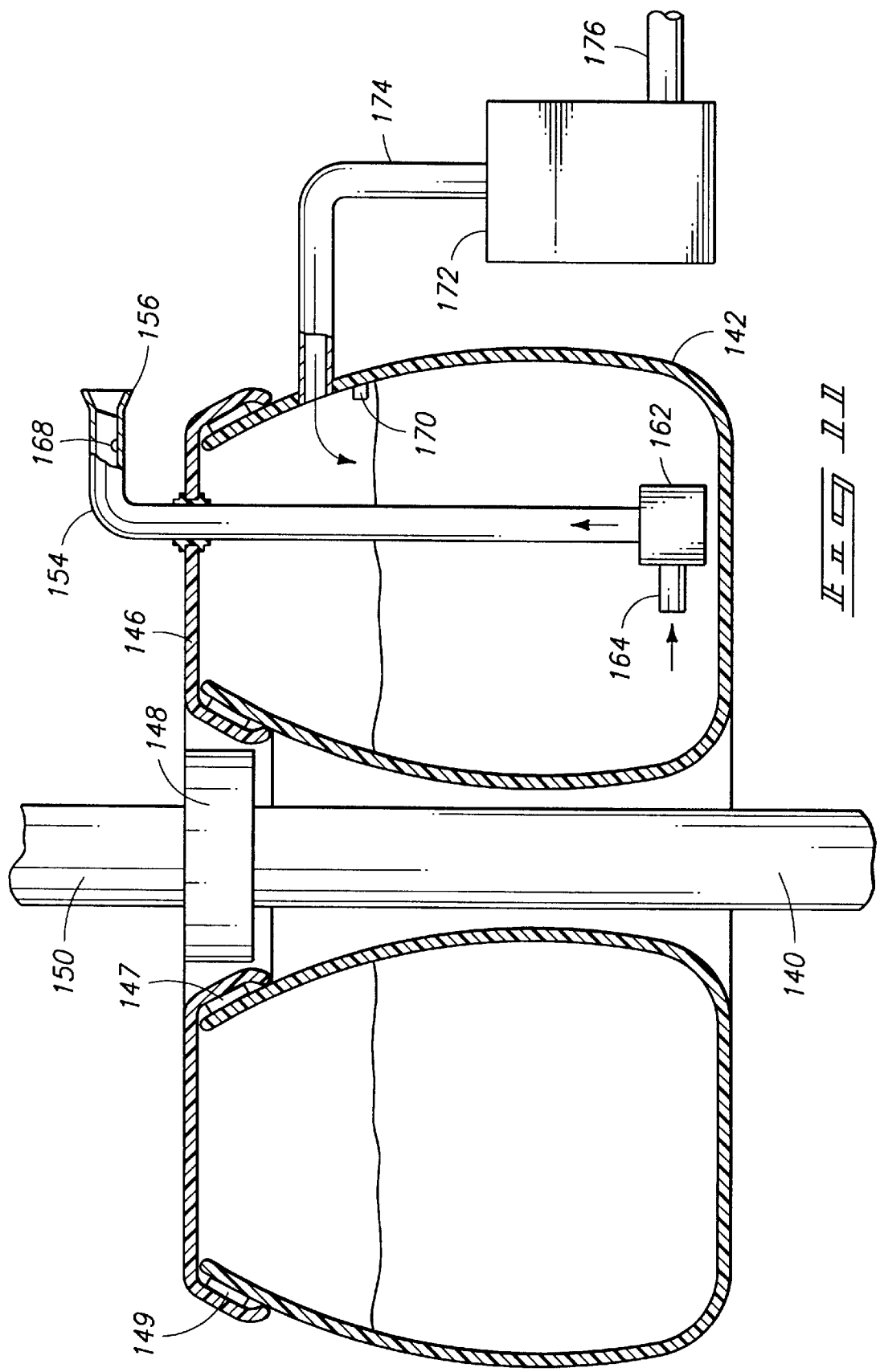

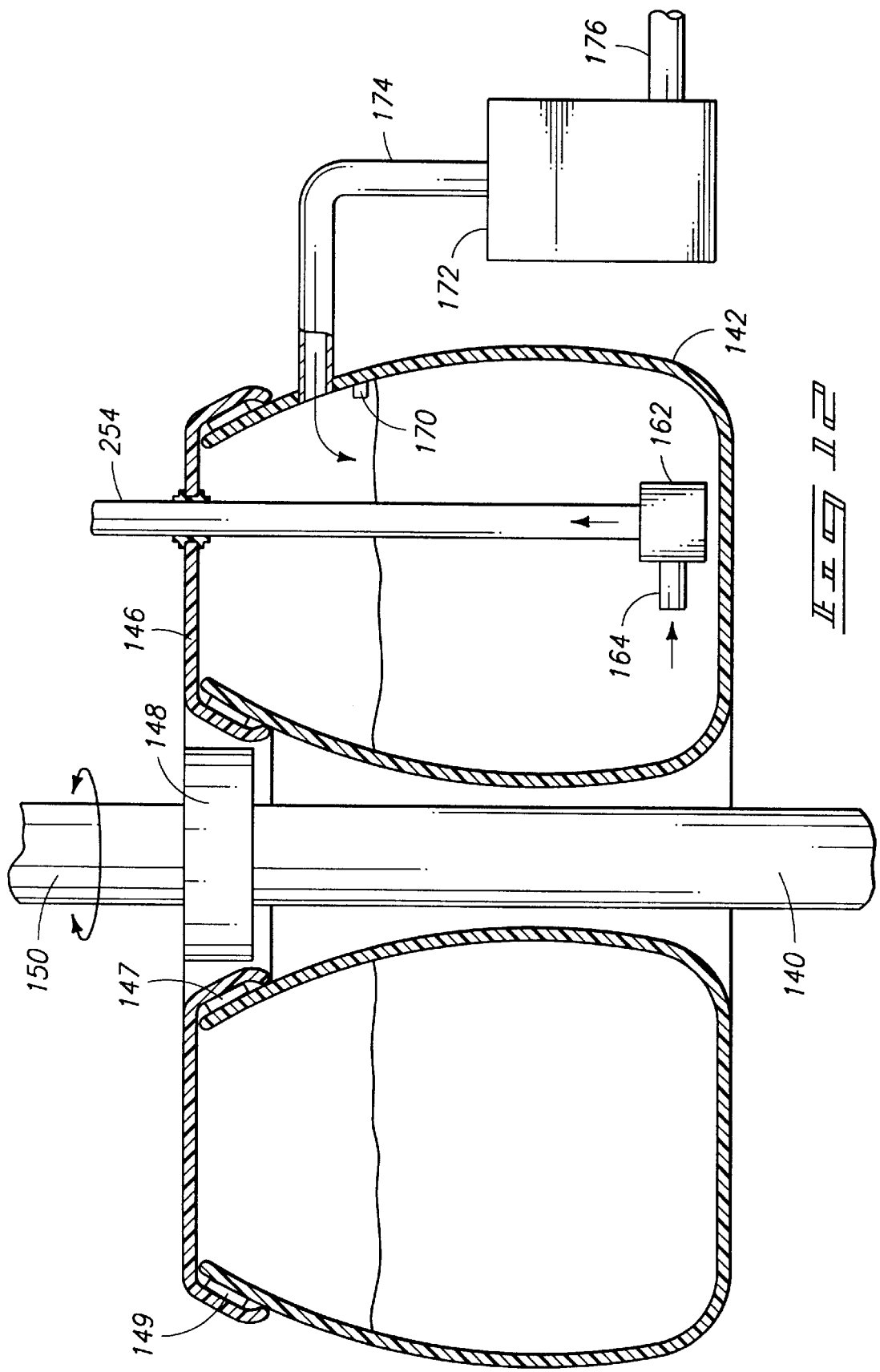

CLOSED LOOP CONTROL SYSTEM, SENSING APPARATUS AND FLUID APPLICATION SYSTEM FOR A PRECISION IRRIGATION DEVICE

TECHNICAL FIELD

This invention relates to an irrigation control system and sensing/application features designed to ensure that the distribution of fluent agricultural materials such as one or more of water, fertilizers, and chemicals are delivered to an agricultural field according to detected needs.

BACKGROUND AND SUMMARY OF THE INVENTION

The cultivation of agricultural crops has evolved over the years as the size and scale of farms has increased from small family farms to large-scale farms. Irrespective of a farm's size, variations in terrain, soil conditions and weather exposure produce non-uniformities of field conditions which affect the preparation and growing of crops.

In order to optimize crop yields, farmers have historically kept track of rainfall, humidity and temperature, as well as soil conditions and the occurrence of bug infestations. More recently, soil has been analyzed to determine nitrogen levels and various other conditions. Even furthermore, advances have been made with the introduction of field condition sensing and data collection which enable gross categorization of agronomic information on a field being cultivated. However, further improvements are needed that will enable better collection and management of agronomic information so that yields can be increased, without overly increasing the costs of production.

Recently, in-ground moisture sensors have been combined with an irrigation controller to control an irrigation cycle of an area of soil. More particularly, such irrigation controllers have been used to control stationary irrigation devices such as are used in golf courses and in orchards. However, such systems are limited in that in-ground sensors tend to be costly and only monitor soil conditions immediately adjacent the sensor. Therefore, it is cost prohibitive to provide a large number of sensors in order to cover a large agricultural field being processed by a large-scale irrigation device such as a center-pivot irrigation device. Furthermore, such stationary irrigation systems are not suitable for irrigating large-scale agricultural fields due to the large number of sprinklers needed on the irrigation system. Furthermore, an agricultural field needs to be periodically cultivated and a complex in-ground irrigation system will cause problems when the field is being turned over is and prepared for its next cultivation cycle.

A typical large-scale farm employs a sprinkler irrigation system for applying water and chemicals to a crop which is being raised. One type of sprinkler system consists of a center-pivot irrigation device which is typically configured to apply water and chemicals to a circular plot of land. End features have been added to such devices in order to adapt them for irrigating square plots of land via the use of controllable end guns, or articulating end booms contained therealong. A typical center-pivot irrigation device has a fixed pivot, and a long body carried by an array of towers having support wheels. A plurality of sprinklers are fixed in spaced-apart relation along the arm, each sprinkler being activated by way of a solenoid valve which enables turning "on" and "off" of a sprinkler nozzle in order to regulate application of water and chemicals to the agricultural field. In operation, the long body, or arm, is rotated about the fixed pivot via the towers, as drive motors on each tower drive the support wheels, causing the device to rotate about the fixed pivot. One or more sprinklers are activated by way of a solenoid valve which distributes water at a desired rate. The rate of application typically depends on the radial location of each particular sprinkler, such that the final result produces a somewhat uniform distribution of water across the field.

Recently, attempts have been made to enable a variable-rate application of water and chemicals to a field in order to deliver water and chemicals to regions of the field in differing amounts. One such effort is disclosed in U.S. Pat. No. 5,246,164 to McCann, et al., entitled "Method and Apparatus for Variable Applications of Irrigation Water and Chemicals". According to this construction, a center-pivot irrigation device having a plurality of sprinkler assemblies arranged in a fixed array is operable to distribute an adjustable amount of water over a zone of ground as the arms pivot about the fixed point. However, further improvements are needed to enhance mobility and accuracy.

Other areas of recent improvement in the field of agriculture involve the use of precision agriculture products. Precision agriculture products typically utilize variable-rate application devices, global positioning system (GPS) devices, and geographic information systems (GIS). Satellite-based global positioning systems enable the determination of precise locations within a field of interest. Geographic information systems enable data management of detected conditions on a field of interest.

One presently available suitable differential global positioning system is manufactured by Trimble, and is sold under the product name Direct GPS for Arc View, Trimble Surveying and Mapping Division, 645 North Mary Avenue, P.O. Box 3642, Sunnyvale, Calif. 94088-3642.

One suitable geographic information system (GIS) is presently available from Environmental System Research Institute, Inc. (ESRI), 380 New York Street, Redlands, Calif. 92373-8100, under the name "ARCVIEW®, for Agriculture". Such a GIS system enables the management of agricultural information by way of a graphical user interface. The GIS system consists of software loaded into memory and implemented on a computer, and forms a graphical user interface that easily enables a user to tabulate data and evaluate collected data for making decisions about a crop being cultivated.

The use of precision agriculture products has been coupled with far-distance data collection techniques for determining certain agronomic features on a field being studied. Satellite imaging techniques and aerial photography techniques have enabled the collection of large amounts of data in order to characterize agronomic information and features on large fields of interest. For example, thermal imaging cameras have been used to determine certain thermal characteristics that manifest themselves on a field being observed. However, such cameras produce a gray scale array of pixels having limited resolution, and further, only collect information periodically when weather conditions permit flight overhead. Such flight-based collection is performed a far distance above a field being monitored. In some circumstances, the presence of certain crop and soil conditions will manifest themselves in the form of a thermally detectable variation upon the land. Similar detection can be performed in the visible, infrared and ultraviolet ranges, enabling the determination of correlated features with such information.

However, the ability to collect agronomic information on a field of interest via far-distance detection techniques often-times has limited capabilities. For example, inclement weather conditions can prevent the collection of information by blocking the ability to detect agronomic features. For cases of satellites, even the presence of moderate cloud cover can disrupt detection of such information. During certain periods of a growing cycle for a crop, the detection of such information can be critical to successful harvesting, as well as to the implementation of remedial measures that must be taken in order to counteract the effects of a bug infestation or fungal attack on plants. Hence, an improved technique which enables the detection of such agronomic information during any time of day, and under any type of weather condition, is desired. Furthermore, a sensing device that enables the detection of an increased number of different agronomic features is also desired. Additionally, a detection device that does not harm crops during the detection process, yet enables the collection of agronomic information while crops are being grown, is also desirable.

Although precision agriculture products have recently enhanced the ability to increase crop yields, further improvements are needed to reduce the overall cost of such systems while improving the control and application of such systems. For example, improvements are needed to enhance feedback-control of such systems in order to better respond to detected needs within a field in applying water and/or chemicals to such a field based upon the detected needs. Furthermore, improvements are needed to verify that such application is producing the desired result, and the field is actually receiving the water and chemicals where they are intended to be delivered. Even furthermore, improvements are needed in the manner in which chemicals are delivered to such a field, particularly for chemicals which are applied in very minute quantities, with very high concentrations. Even furthermore, improvements are needed in the manner in which chemicals are delivered to such a field, particularly where the chemicals are extremely expensive. Yet even furthermore, improvements are needed to the sensing systems in order to reduce their overall cost, while enhancing their overall effectiveness.

In accordance with the present invention, improvements are made to an automatic irrigation system to implement closed-loop control of an irrigation cycle with a movable irrigation device, a detector for detecting moisture presence within an agricultural field, and a controller which compares the detected moisture level with a desired level and regulates fluid delivery by controllably actuating a valve or triggering a switch which controls the fluid nozzles in response to the feedback signal from the detector.

In accordance with another aspect of the present invention, an automatic irrigation system has a movable irrigation device with a fluid nozzle for supplying fluent agricultural material to the agricultural field, and a detector which is configured to detect the actual application of fluent agricultural material to the agricultural field. A controller, coupled with the detector, detects the actual delivery of fluent agricultural material from the fluid nozzle and compares it with the intended delivery of fluent agricultural material so as to determine the operability of the fluid nozzle.

In accordance with yet another aspect of the invention, a movable irrigation device utilizes in-ground moisture detectors in combination with movable sensors to determine irrigation needs within a field being surveyed. In accordance with even another aspect of the invention, an irrigation device has a primary fluid flow conduit for supplying a first fluid and a secondary fluid flow conduit for supplying a second fluid to an agricultural field being processed. A controller is used to control output of water and/or chemicals from each of the first and the second elongated fluid flow conduits of the irrigation device.

In accordance with yet even another aspect of the present invention, a chemical and water irrigation device includes a detector of chemical concentration present within soil of an agricultural field, and a controller which causes the irrigation device to apply chemicals to an agricultural field based upon the detected need.

It is therefore a primary objective of the present invention to provide closed-loop control of a movable irrigation device so that detected moisture levels might be met without any human intervention.

It is a further objective to provide a system for monitoring operation of an irrigation valve such that an irrigation device can determine whether or not an irrigation valve is actually applying a desired chemical and/or water to an area within a field.

It is a further objective to provide an apparatus having a movable irrigation device which supplies fluent agricultural material to an agriculture field in response to needs that are detected by an in-ground sensor and at least one movable sensor carried by the irrigation device.

It is a further objective to provide an irrigation system for effecting chemical and water delivery via separate delivery lines so as to enable proper delivery of chemicals which are highly concentrated, or are delivered in small or minute quantities.

It is a further objective to provide an apparatus for delivering chemicals to an agricultural field in response to a detector which detects the presence of chemical concentration within soil of the agricultural field.

Other objectives, features and advantages of the invention will become evident in light of the following detailed description considered in conjunction with the referenced drawings of preferred exemplary embodiments according to the present invention.

BRIEF DESCRIPTION OF THE DRAWINGS

Preferred embodiments of the invention are described below with reference to the following accompanying drawings.

FIG. 11 is a vertical cross-sectional view taken along line 11—11 of FIG. 9 illustrating construction of a centrally located chemical reservoir tank; and FIG. 12 is a vertical cross-sectional view of an alternatively constructed centrally located chemical reservoir tank for use on the irrigation device of FIG. 6.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

According to one aspect of the invention, an automatic irrigation system includes a movable irrigation device having a fluid delivery nozzle and a fluid manifold positioned along the mobile irrigation device and adapted to receive irrigation fluid from a supply source. The system includes a detector of moisture present within an agricultural field including an output on which signals representing the detected moisture level are placed. The system also includes an electronic storage device having an addressing and reproduction unit that can selectively address and reproduce a plurality of stored command signals. The system also includes first electronic circuitry coupled to the storage device and including an input for command control signals reproduced from the storage device. The electronic circuitry applies the reproduced command control signal to cause the detector to detect moisture from a plurality of different locations within an agricultural field. A second electronic circuitry compares the detected moisture level at each location within the agricultural field with the reproduced command control signals to ascertain whether the moisture level matches the moisture level indicated by the command control signals. One of the first and the second electronic circuitry produces signals for controlling the fluid nozzle in response to the feedback signal from the detector to impart a desired application of irrigation fluid to the agricultural field.

According to another aspect of the invention, a sprinkler for an irrigation system includes a fluid nozzle and a fluid flow sensor. The fluid nozzle is coupled with a source of fluid for delivering the fluid to an agricultural field. The fluid flow sensor is associated with the fluid nozzle and is operative for detecting a fluid flow from the nozzle.

Figure 1:
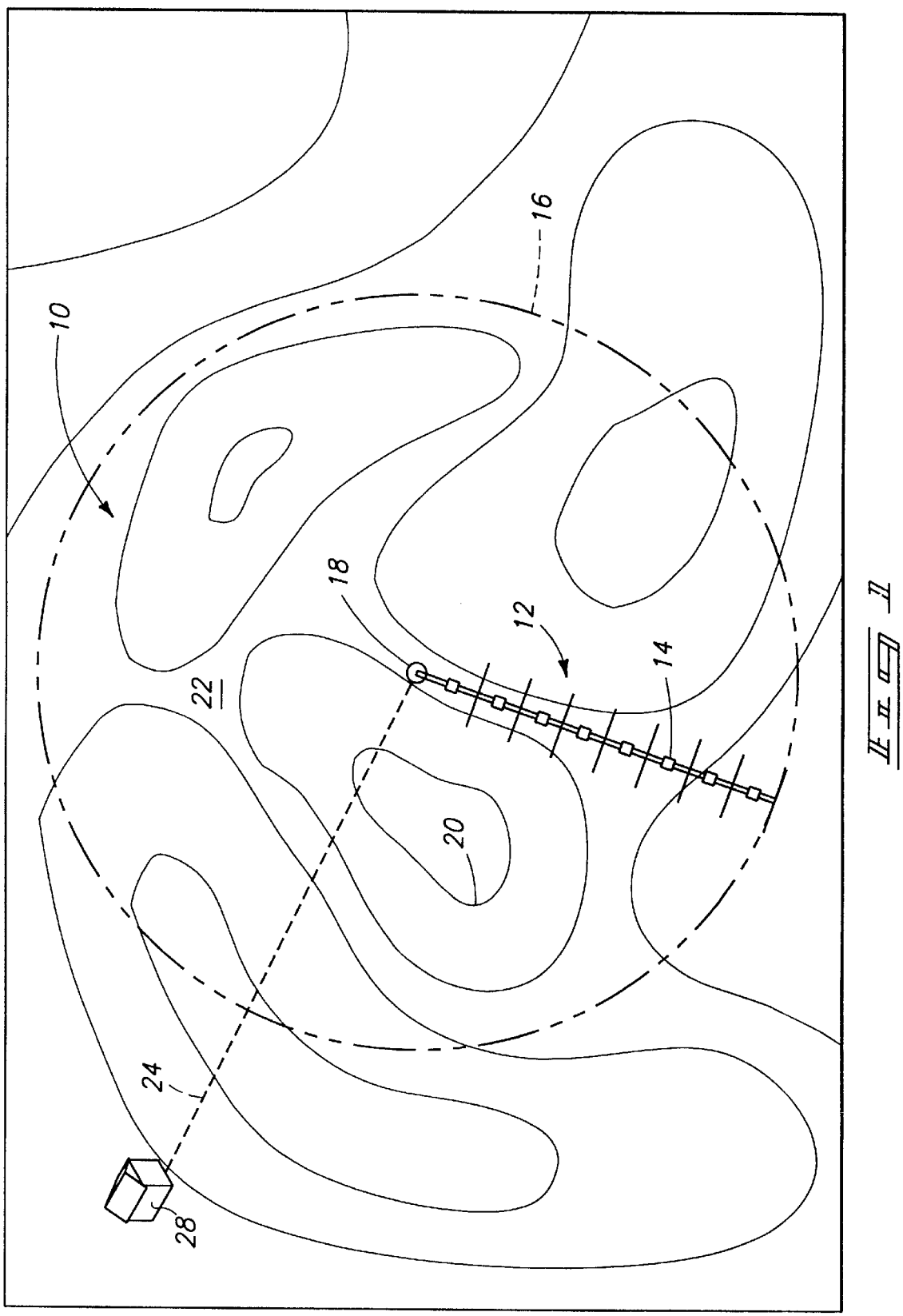
FIG. 1 is a plan view of an illustrative center-pivot irrigation device incorporating control system and sensing elements of a remote sensing and irrigation apparatus of this invention.

With reference to FIG. 1, a representative agricultural field generally designated by reference numeral 10 is shown with a center-pivot irrigation device 12. Device 12 is configured to support and carry a plurality of sensing devices 14 across field 10 within the boundaries of a bounded area 16 being cultivated. Irrigation device 12 is configured to rotate about a fixed pivot end 18 within area 16. Field 10 is depicted with varying topographical features, including elevated portions or hills 20, and depressed regions or valleys 22. Irrigation device 12 supports a mobile-mounted remote sensing apparatus formed at least in part by sensing devices 14. In addition, an electronic interface is carried by pivot end 18, including a power line 24 that supplies power to device 12 as well as transmits collected information in digital form between device 12 and base 28. Home base 28 includes computer-based equipment for processing the detected agronomic information.

Power line 24, as well as a water supply line (not shown) are buried beneath field 10 for supplying power and water to irrigation device 12. In one version, digital signals are transmitted between an electronic interface and a computer supported at pivot end 18 and another computer at home base 28 (see FIG. 3 discussion below). With this implementation, digital signals are superposed over the 60 Hz power supply being provided over power line 24. By transmitting such digital information over a frequency other than 60 Hz, the collected digital information can be separated from the power supply being provided via power line 24. In this manner, the need for an additional dedicated communication line is eliminated. Alternatively, a separate communication cable can be buried along side the power line, between pivot end 18 and home base 28. Further alternatively, an optical cable can be used to transmit optical signals therealong. Even further alternatively, radio frequency antennas can be provided at pivot end 18 and home base 28, enabling radio frequency communication of collected information and device control commands therebetween. Even further optionally, the entire computer-based equipment system can be provided at home base 28. Alternatively, such entire computer-based equipment system can be provided at pivot end 18.

The computer-based equipment on device 12 and home base 28 form a crop management system that allows for the monitoring of sensed agronomic information collected by device 12. The collected data is then reduced by way of the information system provided at home base 28, enabling collection and storage of such data therein. Details will be further discussed below with reference to FIGS. 3 and 4.

In addition to the elevational terrain changes depicted in FIG. 1 in the form of hills 20 and valleys 22, a number of other varying agronomic features might be found and detected on field 10 via device 12. Such features would produce detectable variations of agronomic information on the field. For example, the consistency of soil provided on field 10 can vary between clay, sand, and a mixture of sand and rock. Regions containing rocky and sandy soil will tend to drain water from the surface layer of soil rather quickly. Therefore, such regions will typically have drier soil conditions, on average. Likewise, regions that have a high clay content will tend to retain water, having a higher moisture content, on average. Furthermore, the presence of hills or trees adjacent to the outer periphery of area 16 can result in a decrease in light being transmitted to certain regions of the field. For example, the presence of shade trees along the edge of a field can result in less light being received along a portion of a field. Such a lower light level will result in a decreased amount of evaporation occurring in that region of the field. Furthermore, the reduced levels of light can result in a longer time being required for the growing of crops in that region.

Another agronomic feature suitable for detection on field 10 is the advancement and presence of a bug infestation within a crop growing on field 10. External factors such as bug infestations can cause detectable topographical variations to agronomic features of a field 10 according to FIG. 1. The presence of bugs in certain regions can affect the yield of crops in such regions. In cases where the presence of such bugs are detected, a non-uniform field distribution of bugs can be sensed and tracked in order to make decisions on the spraying of chemicals and pesticides to detected regions of the field. Additionally, the advancing boundary line of infestation can be monitored in order to take preventative and/or remedial measures to control or eliminate such an infestation. Likewise, sensed information can be used to determine and/or predict variations in crop yield resulting therefrom.

Several different techniques can be used to sense the presence of bugs within field 10. One technique involves the detection of minute concentrations of chemicals, such as pheromones, via sensors 14 that are given off by large populations of bugs. Another technique involves thermal detection of such bugs, which results in thermal variations within a field. A further technique involves performing indirect measurements to detect the presence of bugs where detectable color changes to the crop indicate the presence of bugs therein. For example, optical detection of color changes to foliage can be utilized to characterize the presence or absence of bugs from within a region of a field, or identify crop damage (e.g., detect the presence of a fungus that causes late blight in potatoes).

Figure 2:
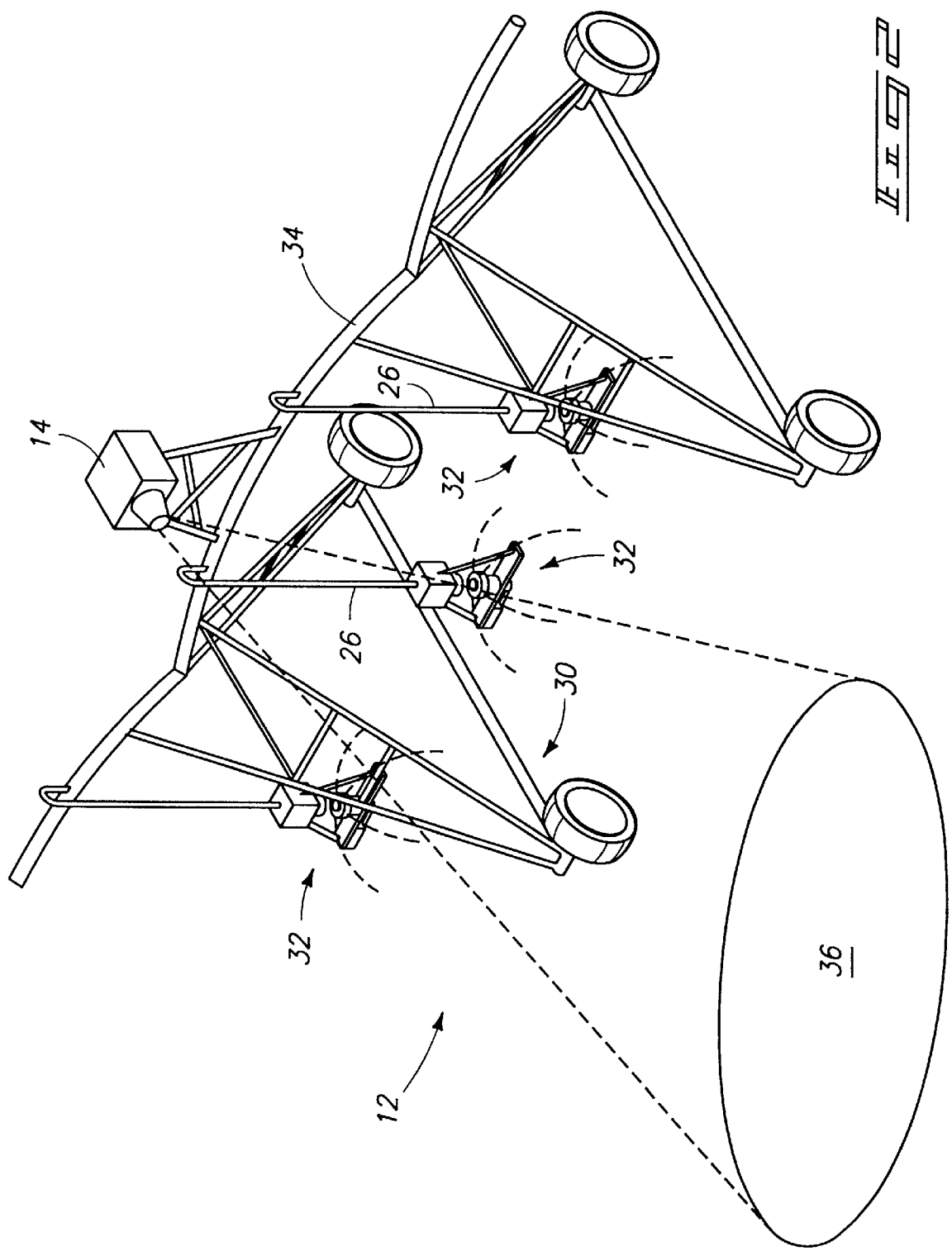
FIG. 2 is an enlarged schematic perspective view of a portion of the irrigation device and remote sensing apparatus of FIG. 1.

FIG. 2 illustrates an enlarged perspective view of a portion of irrigation device 12, including one of an array of sensing devices 14. Sensing device 14 is rigidly mounted atop device 12 by way of a vertically extending mast-portion. Device 12 is supported for rotation about pivot end 18 (See FIG. 1) by a plurality of spaced-apart support towers 30. As shown in FIG. 2, each support tower is provided with a tandem pair of wheels. The wheels are mounted fore-and-aft along a common travel path. Both wheels on each tower are driven by a servo drive motor. Such a construction provides for suitable traction over any soft ground on a field being cultivated. Alternatively, only one of the wheels is driven by a servo drive motor. Activation of the drive motors on each tower via a computerized control system housed in home base 28 (of FIG. 1) drives irrigation device 12 in pivotal rotation about fixed end-pivot 18 (of FIG. 1). A plurality of sprinklers 32 are also distributed in spaced-apart relation radially along irrigation device 12 for delivering water and/or chemicals to the agricultural field. A servo controlled valve, provided upstream of each sprinkler 32, is computer controlled to regulate water delivery to each sprinkler 32. Alternatively, a solenoid relay controlled valve can be used to regulate water delivery to each sprinkler 32.

Pairs of adjacent support towers 30 are connected together by a boom arm 34, as shown in FIG. 2. Each boom arm can be unfastened from, or fastened to an adjacent support tower, enabling lengthening and shortening, respectively, of the irrigation device 12 to tailor it for use with a particular field being cultivated. Sensing device 14 is carried on boom arm 34 in an elevated location relative to sprinklers 32 so as to detect the presence of a field condition within an area of interest 36 on the field. Such provides an unobstructed view of the area of interest 36. In operation, as irrigation device 12 is moved across the field, sensing device 14 detects agronomic information from within the area of interest 36. As device 12 and sensing devices 14 move across a field, area of interest 36 passes along a circular path, collecting information therefrom. By suitably configuring a plurality of sensing devices 14 in spaced-apart relation, information can be detected from substantially all of the areas, or regions of the field contained within the bounded area 16 (as shown in FIG. 1). After detecting the information, a computer and a geographic information system (GIS) can be used to direct application of chemicals (including water) to areas of interest within a field via irrigation device 12.

Figure 3:
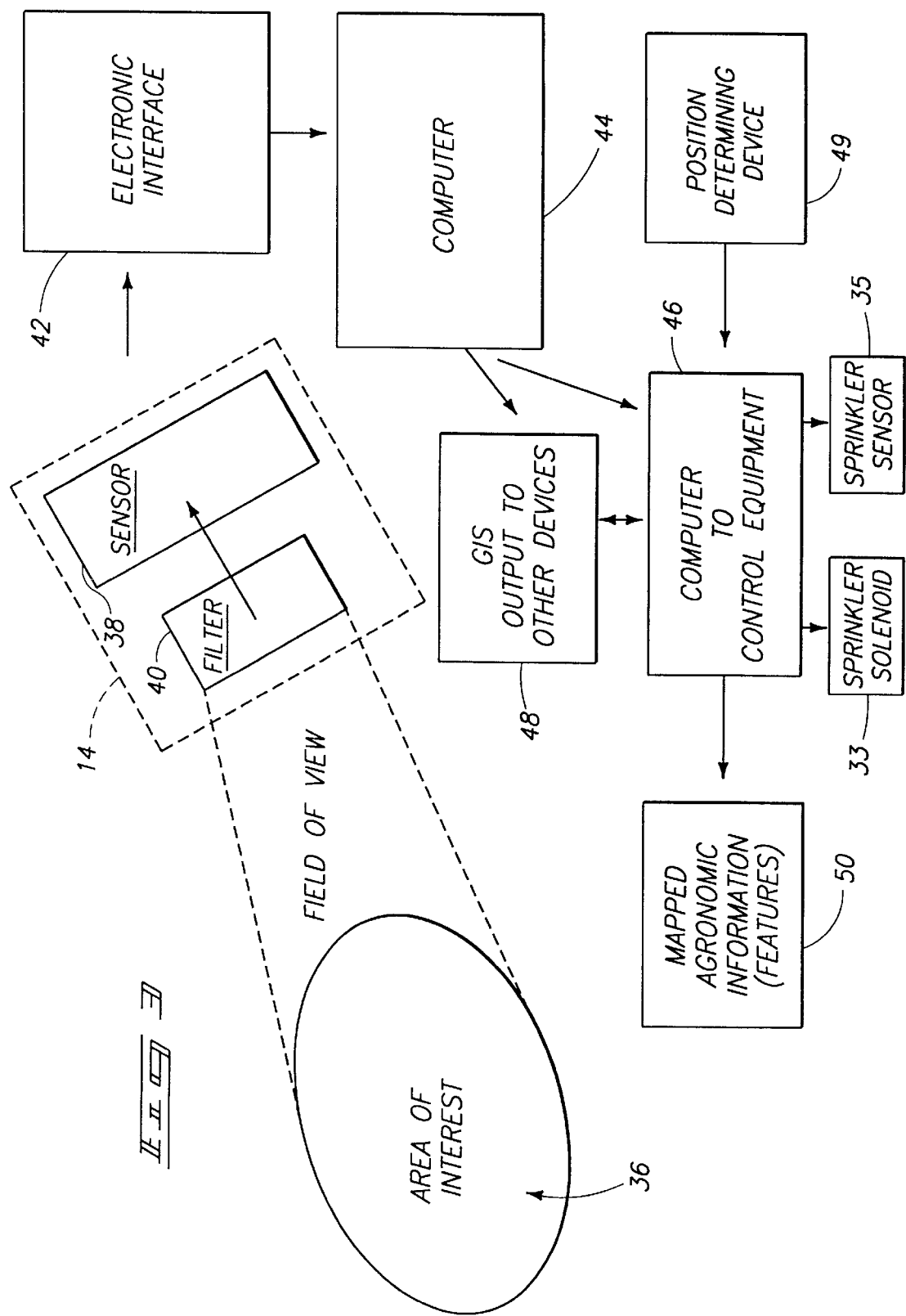
FIG. 3 is a schematic block diagram illustrating the data collection and control system used with the remote sensing and irrigation apparatus of the first embodiment of this invention, and carried by a center-pivot irrigation device.

FIG. 3 illustrates one suitable implementation for the detection and collection of information being sensed from a field by way of sensing device 14. Sensing device 14 forms a sensor that is configured to detect a sensed condition from area of interest 36, by detecting the area of interest 36 via a field of view. Sensing device 14 includes a sensor 38 and a filter 40 configured to modify a sensed signal to filter information being detected from undesired information from within the area of interest prior to being detected by sensor 38. Alternatively, filter 40 can be configured to filter information from a signal output from the sensing device 14, thereby cleaning up the signal. Detected information is delivered from sensing device 14 via an existing power line that extends along the radially extending boom arms 34 (of FIG. 2) of the irrigation device to an electronic interface 42. The boom arm power line (not shown) supplies power to the drive motor on each wheel assembly. Information is delivered along the power line similar to the way information is delivered between pivot end 18 and home base 28 via power line 24. Typically, electronic interface 42 can be provided in a fixed, or stationary location at the fixed pivot end of the irrigation device. A rotating electrical connection, or slip ring is formed at pivot end 18 (of FIG. 1). Likewise, a computer 44 can be similarly provided adjacent the pivot end for processing information and transferring same to home base 28.

In operation, the electronic interface 42 of FIG. 3 receives detected signals from each of the plurality of sensors 38 configured along the device. Interface 42 delivers the signals to computer 44 where they are selectively processed. Preferably, each sensor 38 is separately addressable, enabling identification of data transmission therefrom. Electronic interface 42 consists substantially of circuitry and filters that enable the conversion of analog-sensed information into a digital format that can be readily received by computer 44. Alternatively, sensor 38 can produce a digital output that is received by interface 42 in a format suitable for transmission to computer 44. Further alternatively, sensor 38 can be provided in direct field of view of area of interest 36, with filter 40 being provide between sensor 38 and electronic interface 42. In this configuration, filter 40 is used to filter analog or digital information from sensor 38 before being delivered to interface 42. Computer 44 then delivers information to another computer 46 that is configured to control the operation of equipment used to prepare and cultivate the field.

As shown in FIG. 3, computer 44 can convey sensor detected information to a geographic information system (GIS) 48 suitably configured for output to other devices, such as computer 46. Additionally, or alternatively, computer 44 can convey the sensor detected information directly to computer 46. For example, power line 24 (of FIG. 1) conveys detected sensor information from computer 44 on device 12 to computer 46 at home base 28. Geographic information system (GIS) 48 provides certain benefits in tabulating and visualizing data that was detected by sensor 38. For example, yields can be estimated while crops are still growing in the field. Furthermore, a position determining device 49 is also configured with the sensor 38. Device 49 enables one to correlate sensor position information with the sensed information from sensor 38. In this manner, detected sensor information from area of interest 36 can be stored, or mapped into memory by computer 46 over all of the detected regions in field 10 being scanned by sensing devices 14. Hence, the exact location of an area of interest 36 within an agricultural field being monitored becomes readily known during the sensing of such information. Alternatively, position determining device 49 can input sensor location information pertaining to area of interest 36 directly into computer 44, which is forwarded to computer 46. Detected information from sensor 38 and position information from device 49 are correlated via computer 46 where they are formatted in a mapped configuration for tabulating mapped agronomic information, or features 50, in a computer database. In one version, a look-up table is used to store information being collected for areas of interest within a field.

Computer 44 of FIG. 3 is formed from a micro computer having a central processing unit, one or more forms of memory, a plurality of input/output ports, and transmitting/receiving circuitry. For constructions that use an array of antennas in place of power line 24 (of FIG. 1), an antenna couples with the circuitry to enable transmitting and receiving of information with a similarly configured computer system contained in home base 28. Alternatively, computer 44 can be wired directly via input/output ports and power line 24 (of FIG. 1) with computer 46 and/or the geographic information system (GIS) 48. Further alternatively, computer 44 and computer 46 can be one and the same, wherein a geographic information system (GIS) is loaded into software in the computer for performing formatting and tabulation of data received from sensed agronomic features via sensors 38.

Computer 46 of FIG. 3 is formed from a central processing unit, memory, input/output ports, and any of a number of peripheral devices. Suitable peripheral devices include a keyboard, a user-viewable screen display, a CD/ROM data storage device, a hard drive, a modem, a telephone and telephone line, a radio, and a floppy disk drive. Additionally, software (including a WINDOWS® environment, interface software, and the above-mentioned geographic information system) is loaded into memory within the computer. Such software integrally forms a graphic user interface, viewable by an operator via the display screen, and reconfigurable via the keyboard and/or a mouse input device.

The provision of a telephone, either hard wired or cellular, enables communication via the telephone with remote locations from the device to enable data collection and remote control of the device. In fact, any of a number of wireless communications links can be provided in combination with the device of this invention to enable remote monitoring and control. For example, telephone connectivity can be used to enable Internet access, as discussed later, to the device and its associated computer and control systems. Accordingly, requests can be received by the device of this invention from the outside work, for example from a cellular telephone, to direct the device to focus on a particular area of interest within a field.

Geographic information system (GIS) 48 is a presently available software-based product that can be commercially purchased. One version presently available from Environmental System Research Institute, Inc. (ESRI), of 380 New York Street, Redlands, Calif. 92373-8100, is sold under the name "ARCVIEW®, for Agriculture".

Position determining device 49 of FIG. 3 is formed from a global positioning (GPS) receiver. One such presently available device is manufactured by Trimble, and is sold under the product name Direct GPS for ArcView, Trimble Surveying and Mapping Division, 645 North Mary Avenue, P.O. Box 3642, Sunnyvale, Calif. 94088-3642. Alternatively, position determining device 49 can be formed from a compass, such as a digital flux gate, or magnetometer compass formed on the arm of device 12 (of FIG. 1). The compass monitors the rotated position of an irrigation device relative to the fixed end-pivot, enabling the determination of the location of a sensing device carried on the irrigation device at a radially fixed location. Alternatively, a shaft encoder can be substituted for the compass. Knowledge of the radial location of a sensing device provided on the irrigation device, in combination with knowledge of the rotated position of the irrigation device, allows one to determine the precise location of an area of interest 36 being detected within a field. Knowledge of the set-off distance between the sensing device 14 and the area of interest 36 enables accurate location of area 36 with respect to the sensing device 14. Further alternatively, a rotary potentiometer can be utilized at the linkage between the end-pivot of the irrigation device and the arm of the irrigation device in order to determine the rotated position of the device therebetween. Such optional constructions enable economical determination of the position of an area of interest 36 being detected by a sensor 38.

As shown in FIG. 3, computer 46 is housed within home base 20 (see FIG. 1) where it receives sensor detected agronomic information via power line 24 from sensors 14 along device 12. Computer 46 collects such information, preferably in a suitable format configured via geographic information system (GIS) 48, and simultaneously maps the position of sensor 38 in relation to a detected area of interest 36 by simultaneously collecting information from position determining device 49. In this manner, sensed information is combined with positional information to form a tabulated database of agronomic information over the cumulative areas of interest within a field. By collecting such agronomic information via sensor 38 at various points in time, the tabulated information can be combined to form a collection of sensed agronomic information and position information that extends across space and time. Computer 46 is then able to produce mapped agronomic information 50 in the form of data files, or look-up tables, that are subsequently used by the computer to make control decisions for performing soil and/or crop operations during cultivation of a field. For example, computer 46 can be programmed to control solenoids 33 to operate sprinklers and apply variable rates of water and/or chemicals to a field, as need be, pursuant to the detected agronomic information collected from the field.

Additionally, one feature of this invention is provided by a sprinkler sensor 35 that produces an output indicating whether a sprinkler is distributing water (and/or chemicals) when solenoid 33 is opened by computer 46. In this manner, sprinkler sensor 35 provides a feedback signal to computer 46 indicative of the operating state of an associated sprinkler under the operating control of solenoid 33. Such an implementation enables computer controlled monitoring to verify whether a desired, pre-calculated application of fluent agricultural material is actually being applied to an agricultural field. Details of sprinkler sensor 35 are discussed further below with reference to FIG. 5.

Furthermore, closed loop control can be implemented "on the fly", as device 12 detects agronomic information on a field, then operates solenoids 33 according to determined and/or detected needs in order to deliver variable rates of water and/or chemicals to the field. In this manner, device 12 forms an apparatus for detecting/measuring and subsequently controlling the optimized growing of a crop in a field.

According to the implementation of FIG. 3, a variety of different types of sensors can be utilized with electronic interface 42 and computers 44 and 46 to detect a variety of different agronomic information from a field being cultivated. Detected features are mapped to a location where they are detected via a mapped agronomic information database 50. Database 50 forms part of a crop management system implemented via the computer 46 and geographic information system (GIS) 48.

According to the device of FIGS. 1–4, a variety of sensing devices 14 having sensors 38 can be carried across a field to detect agronomic information from an area of interest. One type of sensor is an imaging camera configured to detect electromagnetic radiation from within a field of view. In one version, the camera is a line-scan video camera that produces a gray scale output indicating detected conditions from within the field of interest, as area of interest 36 scans the field. For example, thermal radiation can be detected by the camera. Alternatively, infrared radiation can be detected by the camera. In another configuration, ultraviolet radiation can be detected from the camera. Detected thermal radiation can be used as an indication of the presence of bug infestation within a region being detected. Detection of high amounts of infrared radiation can be used as an indication of abnormal leaf conditions on plants within the region being detected. Detection of abnormal amounts of ultraviolet radiation can be used to indicate foliage and plant conditions being detected.

An additional camera configuration for sensor 38 envisions a digital camera for detecting visible light outputting Red, Green, and Blue (RGB) values in a standard digital format. Even further, one version of such a camera can be used to detect foliage color of a crop in order to estimate fertility and micro-nutrient levels present in the field of interest.

Another configuration for sensor 38 envisions the use of a temperature sensor for detecting the thermal exposure of crops within the field of interest. For example, a temperature measuring device can be used to detect the near-ground temperature adjacent to crops in the field in order to determine whether particular plants have been subjected to frost, or freezing conditions. Hence, such agronomic information can be used by computers 44 and 46 to schedule remedial measures following localized damage to crops resulting from a recent frost. For example, frost may occur within low-lying valleys of a field, whereas high-lying areas are not damaged by the presence of such frost. Subsequent applications of fertilizers and water to the field can be adjusted so as to at least in part alleviate abnormal crop growth from a detected occurrence. Additionally or alternatively, selected regions of a field can be harvested at a different time, due to detected conditions that have affected the growth rate of a crop. Examples of thermal sensing devices include resistive thermometers, such as platinum resistive thermometers (or PRTs), thermistors, thermocouples, and semiconductor-based PN junctions. Various other commercially available types of sensors can also be used for detecting any of a variety of agronomic information from a field of interest.

Another type of sensing device suitable for use in forming sensor 38 includes any of a category of light detecting sensors used for measuring light intensity being subjected onto a field. For example, a photovoltaic sensor, similar to a solar cell, can be used to detect the presence of light impinging on an area of interest on a field. Such a semiconductor-based device as a photodiode can be used to measure light intensity, producing an output voltage dependent upon the amount of light falling on the device. Alternatively, a photoconductive sensor can be configured to detect changes in current flow therethrough proportional to the intensity of incident light projected onto the device. Another type of photoconductive device is a light-dependent resistor (LDR) which produces a change in resistance when illuminated. Such devices typically respond to different wave lengths of light in a manner very similar to that of the human eye. However, such devices have a moderately slow response rate. For purposes of agrarian detection, such a response rate is not deemed to be critical. Another optical sensor configuration utilizes optical, or opto-switches having a light sensor, typically a photo transistor, and a light source, usually a light-emitting diode (LED). Such a device can be used to detect the presence of an object, or position, motion, and temperature associated with the sensor. For example, such a device can be configured to detect the presence of a bug between a source and a sensing element on the sensor. Likewise, such a device could be configured to detect the presence of snow flakes, or water droplets between a source and a sensing element on the sensor device. Alternatively, the light source can be eliminated, and a mirror can be added such that the detector is aligned with the mirror in order to detect the presence of an object therebetween.

Furthermore, any of a number of sound-detecting sensing devices can be used for sensor 38 in order to detect agronomic information from a field of interest. For example, a carbon microphone, capacitive microphone, a moving coil microphone, or a piezoelectric microphone can be used to detect sound waves from within a field of interest. One example would be to detect the presence of thunder in an effort to characterize any severe or inclement weather condition. Another example would be to detect sounds produced by bug infestations, such as the presence of grasshoppers or locusts present within areas of interest.

Additional devices for detecting agronomic features can be envisioned for use as sensors 38, including wind meters for detecting near-ground levels of wind that might affect the growing characteristics of a crop being cultivated. For example, wind affects the water and chemical application pattern by causing a lateral movement of the applied material. Additionally, winds can have an effect on the pollination of certain crops contained within a field. Analysis of such winds can provide a better understanding of the effect winds have on pollination during certain critical periods in the growth cycle of a plant. Similarly, extremely high levels of winds can have a damaging effect on a crop, stressing the plants and affecting their rate of growth subsequent thereto. Hence, such information can be utilized to determine remedial measures to be implemented in the growing of a crop that might ameliorate such a stress condition to a plant. Additionally, the decision on when to harvest such a crop can be rescheduled pursuant to the availability and studying of such information via a crop management system.

Other similar devices can include meters configured to measure the amount of rainfall that has fallen on a location of the field. Similarly, force sensors such as strain gauges and piezoelectric sensors can be used to detect the effects of hail and sleet upon a crop within a field. Additionally, various chemical detection sensors can be utilized to monitor soil conditions within the ground of a field. Likewise, moisture sensors can be utilized to directly detect the moisture content within soil, by configuring the sensor so it is intermittently inserted within the soil in the field of view as it is carried over the field by the irrigation device. Furthermore, such sensors can be used to detect the presence or lack of soil-based nutrients, such as nitrogen, from within the soil contained within the area of interest covered by the field of view.

An additional sensing feature that can be provided by the device of this invention includes various sensors used by a weather station for detecting weather conditions in a field being cultivated. Such sensors may include several of the aforementioned devices, as well as standard meteorological devices used to detect temperature, humidity, wind, and rainfall. Such meteorological weather-based information can be detected directly on device 12 (of FIG. 1), or directly at home base 28. Such information is compiled by computer 46 (of FIG. 3) where it is used to make decisions about controlling various operations during the cultivation of a crop. For example, decisions can be made on when to operate a sprinkler via control of solenoid 33 by computer 46. Such an implementation forms a closed-loop system, where a sensor 38 detects a water condition from within an area of interest 36, after which computer 46 makes determinations as to the need to water such area of interest. In response to such a decision, computer 46 can enable or disable operation of the sprinkler via solenoid 33 (as shown in FIG. 3). Alternatively, information being collected can form an open-loop system, wherein information is accumulated over time for each of the areas of interest within the field in order to make decisions on when a crop should be harvested. Additional decision making based upon collected, or tabulated agronomic information would provide a similar open-loop system for determining crop growing decisions.

Computer 46 can also be configured to implement any of a variety of artificial intelligence techniques to enhance the collection and processing of sensed data from within an area of interest of a field. For example, neural-network and fuzzy logic implementations can be utilized in order to facilitate compilation and processing of data into a manageable quantity suitable for making decisions about operations to be formed on a field being cultivated. For example, detected levels of the sun, moisture, and temperature distributed in varying proportions across a field being cultivated, enable a farmer to make decisions about which regions of a particular field require additional watering, and which regions no longer need any additional water. In this manner, savings can be made in preventing the waste of water and chemicals being applied to areas of a field where they are not needed. Furthermore, over-watering of certain regions of a field might lead to mold and fungal infestations that can prove deleterious to the growth of a crop.

Figure 4:
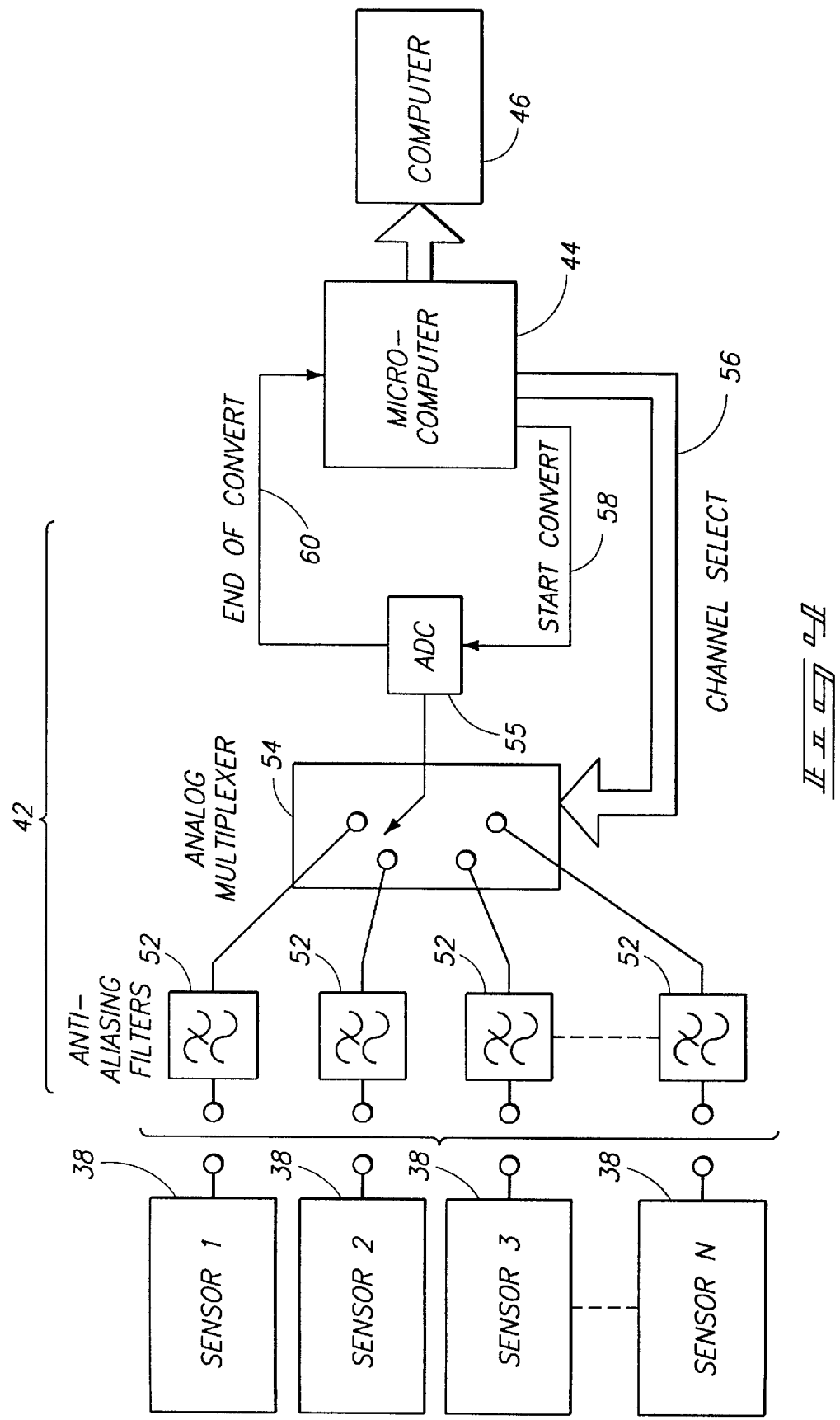
FIG. 4 is a schematic block diagram illustrating a data collection multiplexing configuration suitable for collecting information from a plurality of remote sensing apparatus carried by the center-pivot irrigation device of FIGS. 1–3.

According to FIG. 4, an array of sensors 38, carried on an irrigation device, are depicted for selective monitoring via electronic interface 42 and for input to micro computer 44, and computer 46. Additionally, or alternatively, sprinkler sensors 35 (see FIGS. 3 and 5) can be selectively monitored via the implementation of FIG. 4. For purposes of disclosing the implementation of FIG. 4, sensors 38 will be used, although it is understood that sensors 35 and in-ground sensors 106 (see FIG. 6) can also be monitored with this electronic interface 42.

FIG. 4 illustrates a data acquisition device suitable for presenting detected agronomic information to a crop management system. Detected agronomic information is received from each of sensors 38 (i.e. sensors 1-n) as they are carried over a field to be cultivated. However, in order for computer 44 to be able to detect all of the incoming signals, an analog signal multiplexing scheme is implemented via multiplexer 42. Essentially, "n" sensed analog input signals are input into micro computer 44 in the form of digital signals, after which they are transferred to computer 46 for use by a crop management system.

Alternatively, sensors 38 of FIG. 1 can produce digital output signals, wherein filters 52 and multiplexer 54 are both digital. Filters 52 will digitally filter the output signals from sensors 38, after which multiplexer 54 will selectively configure communication between microcomputer 44 and sensor 38 for data transmission therebetween. In such an implementation, the need for an analog to digital converter (ADC) 55 is eliminated. Collection of such information in a digital form requires implementation of anti-aliasing features during sampling and filtering of such digital signals. Hence, an anti-aliasing filter implementation is preferably realized in such a construction.

According to the analog sensor implementation depicted in FIG. 4, electronic interface 42 is formed by a plurality of anti-aliasing filters 52 and an analog multiplexer 54 configured to selectively receive filtered inputs from sensors 38 of a sensing device carried over a field of interest. An analog to digital converter 55 converts detected analog signals into computer recognizable digital signals. In operation, analog multiplexer 54 selects one of the "n" input signals from a sensor 38. Multiplexer 54 then applies the signal to the analog to digital (ADC) converter 55. Converter 55 communicates with micro computer 44 via a pair of control lines 58 and 60. Namely, line 58 forms an output from micro computer 44 that instructs converter 55 to begin a conversion. The other line 60 forms an input that allows the converter 55 to tell the micro processor 44 when it has completed a conversion, and is ready to receive more data. Essentially, the first consists of a start of conversion signal. The second consists of an end of conversion signal. Hence, multiplexer 54 requires three separate control lines from micro processor 44 in order to select one of the "n" input channels. Therefore, line 56 enables channel selection via activation of multiplexer 54 responsive to commands therefrom.

According to the analog sensor implementation of FIG. 4, anti-aliasing filters 52 operate to eliminate any high frequency noise that ends up being carried along the signal lines from each sensor 38. For example, if a particular type of sensor being used has a useful signal bandwidth of 1.2 kHz, converter 55 should sample each channel of data with a suitable sampling rate. Typically, the sampling rate should be set to twice the useful signal frequency. The removal of any high frequency noise above the desired bandwidth frequency is carried out by selecting a suitable filter 52 to prevent any effects of signal aliasing. For example, suitable filters 52 for the above exemplary bandwidth would consist of low-pass filters having a cut-off frequency of 1.2 kHz, assuming slight attenuation about 1.2 kHz is acceptable. One realizable filter would consist of a Butterworth filter. Even for cases where a fifth or sixth order Butterworth filter is used, such a realized filter is still not ideal. Therefore, a suitable sampling rate should be set, above the Nyquist rate. Selection of a 20% buffer will give a sampling rate of 2.88 kHz. In order for the analog to digital converter 55 to carry out this sampling rate for each channel, converter 55 must be capable of "n"×2.88 kHz, or a conversion time of 3.5 microseconds. A converter having such capabilities can be readily purchased.

In operation, micro computer 44 receives converted digital signals corresponding to detected analog data from each of sensors 38 shown in FIG. 4. Similarly, micro computer 44 receives corresponding signals from each of sprinkler sensors 35 (as well as in-ground sensor 106, in the embodiments of FIGS. 6 and 7). Micro computer 44 also controls operation of multiplexer 54 to direct selection of the sensor being monitored. Micro computer 44 delivers such received information to computer 46. According to the implementation depicted in FIG. 1, power line 24, in combination with suitable transmitting and receiving (or input/output) circuitry, conveys information between computers 44 and 46 (of FIG. 4). For the case of in-ground sensors 106, capacitive sensors in each in-ground sensor send signals to micro computer 44 via separate dedicated underground wires. Alternatively, each sensor 106, or groups of wired together sensors 106 can send signals to micro computer 44 via transponder circuitry and associated antennas.

Sprinkler Fluid Flow Feedback Sensor

Figure 5:
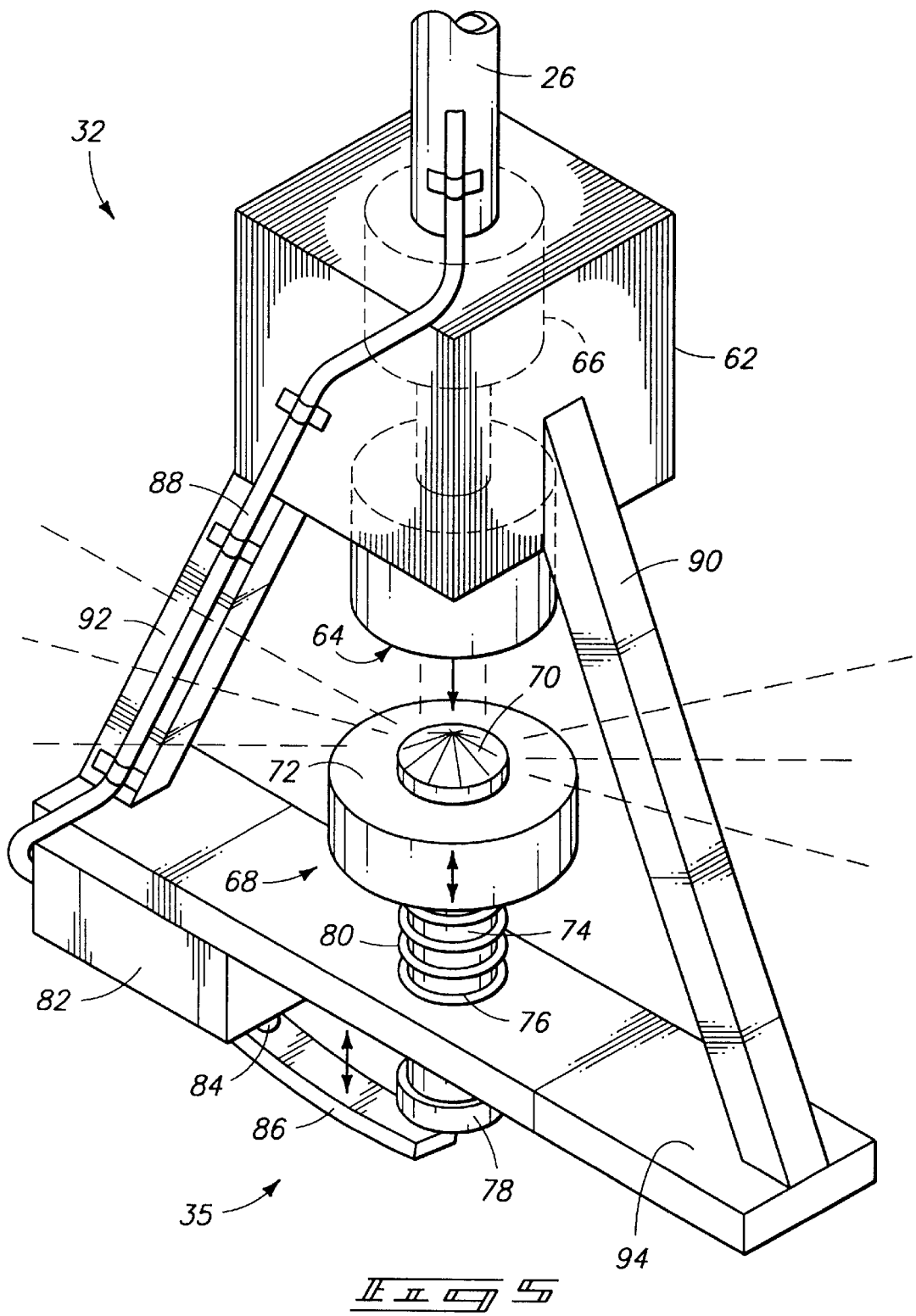
FIG. 5 is a perspective view of one sprinkler assembly suitable for use with the irrigation device of FIGS. 1–3 and having a detector suitable for sensing flow of fluent agricultural material onto an agricultural field.

FIG. 5 illustrates sprinkler 32 as implemented on the center pivot irrigation device of FIGS. 1–4 for producing an operating feedback signal via a sprinkler sensor 35. Sprinkler sensor 35 allows determination of whether sprinkler 32 is actually open or closed, whether or not an associated solenoid valve 66 is open or closed. More particularly, sprinkler 32 is suspended from fluid supply line 26, with nozzle body 62 depending from line 26 where it is welded. A nozzle 64 depends from nozzle body 66, downstream from solenoid valve 66, for ejecting fluidic agricultural material such as water, chemicals and/or fertilizer. Fluid is controllably released via activation and deactivation of solenoid valve 66.

A diffuser assembly 68 is positioned directly beneath nozzle 64, in the direct path of fluid being ejected from the nozzle. Diffuser assembly 68 is supported from nozzle body 62 on a base plate 94 carried at each end by arms 90 and 92, respectively. Assembly 68 is formed by a diffuser 70 situated atop a cylindrical support shaft, or plunger 74 and having a diffuser ring 72 situated about diffuser 70. A cylindrical coil spring 80 seats diffuser 70 and ring 72 in a vertically raised position when valve 66 is shut off. According to one construction, spring 80 is formed from spring steel. Shaft 74 is slidably supported within a cylindrical bore 76 in base plate 94 such that, when valve 66 is open and nozzle 64 ejects water, water pressure acting against diffuser 70 and ring 72 downwardly depress shaft 74. In this manner spring 80 is compressed, enabling the enlarged retainer end 78 of shaft 74 to contact and downwardly bias switch actuator 86.

Spring 80 is sized such that the normal operating pressure of fluid being ejected from nozzle 64 will depress diffuser assembly 68, causing actuator 86 to disengage from a contact 82 of a contact switch 84. Preferably, contact switch 82 is a mechanically activated switch coupled with pair of electrical wires 88 such that closure of switch 82 opens the electrical loop otherwise formed by wires 88. Depression of diffuser assembly 68 opens switch 82, interrupting the conductive path of wires 88. In this manner, electrical continuity of wires 88 and switch 82 can be monitored at a central location of an irrigation device via a computer to determine whether a valve is actually open or closed.

Since the purpose on an irrigation system is to deliver a specific amount of water or chemicals, sensor 35 allows system verification that fluid application is actually occurring. Otherwise, if left to automated or computerized control, a stuck or broken valve might cause a significant loss of crop yield, particularly for a sprinkler located at the radial outmost location of a center pivot irrigation device. By properly sizing the spring constant of spring 80, the sensitivity of sprinkler sensor 35 can be adjusted so that even reductions in fluid flow capacity can be detected. Since the flow rate varies along the length of the pivot, the springs are sized accordingly to match the corresponding flow pressure at each sprinkler location.

Sprinkler sensor 35 can directly detect a flow of fluid, and indirectly detect whether the solenoid valve 66 controlling the flow of fluid is actually working. Flowing fluid from nozzle 64 has a momentum which contacts diffuser 70 and ring 72, dispersing and distributing the water laterally outwardly, causing a force to be applied to diffuser assembly 68. The resulting force acting on diffuser 70 and ring 72 compresses spring 80, releasing contact 84. For purposes of spring design, the well know spring constant is determined by $F=-kx$, where F is the applied force, k is the spring constant, and x is the spring displacement, or compression. By determining the force applied by water momentum and selecting the spring constant, plunger displacement, or travel, can be tailored to a desired level so as to release and compress contact 84 via actuator 86.

According to one construction, contact 84 closes an electrical contact between the two wires 88 when diffuser 70 is depressed, forming a low impedance electrically conductive circuit that is readily detectable via electronics associated with a control computer. As water flow stops, contact 84 is opened which creates a high impedance open circuit between wires 88. Alternatively, contact 84 can form a closed circuit when raised, and an open circuit when lowered. Essentially, the associated detection electronic circuitry (not shown) associated with the control computer detects resistance changes at contact 84, within switch 82.

Although the fluid, or water, momentum principle implemented via sprinkler sensor 35 of FIG. 5 proves reliable, simple, and effective, it is to be understood that other alternative implementations and constructions for a sprinkler fluid flow sensor are also envisioned according to this invention. For example, one alternative implementation uses a light beam placed across a water path, with a detector detecting presence of the light beam from an opposite side of the water path when fluid flow is terminated. Another implementation uses a water pressure sensor placed between the valve and the nozzle in order to detect pressure changes. Yet another implementation uses a sensor for detecting one or more electrical characteristics of the fluid such as resistance or capacitance as part of an electrical circuit. In this manner, pressure changes in the fluid can be detected, as well as the presence or lack of fluid, as the electrical characteristic changes. Even another implementation uses a sensor for measuring temperature changes since a flowing fluid such as water will usually have a different temperature than the surrounding air temperature. Yet even other implementations can use signals such as sound signals, radioactive source signals, etc. which travel across the water path, similar to the above-mentioned light beam. Changes to the signal as it interacts with fluid can be used to detect the presence or lack of fluid.

Closed Loop Pumping System

A center-pivot irrigation system as illustrated in FIGS. 1–5 is used to distribute water over an agricultural field. Water is pumped through a main line (typically one-quarter mile long) to the nozzles located along the pivot (see FIG. 1). Usually, the mainline pipe 34 is approximately seven inches in diameter (see FIG. 2). In many cases chemicals are added to the water for the purpose of applying them to the soil with the water. By doing this, water can be beneficially used as a transport medium. This process is largely limited to chemicals which can be applied in diluted quantities (such as water-soluble fertilizers) to an agricultural field.

However, there is a need to apply other chemicals which require applications that must be applied in small quantities and at higher concentrations than can be accomplished via a pivot main line 34 (of FIG. 2). These highly concentrated compounds are typically applied to the plants rather than to the soil. They include certain herbicides, pesticides, and fungicides. The compounds tend to be expensive chemicals when compared to fertilizers. For these chemicals to be effective they must be applied using concentrations that have specific upper and lower limits.

The combination of high chemical cost coupled with the effective concentration limits means that application must be carried out by some other way than via the pivot main line which is designed for high volume fluid flow. Application of the highly concentrated chemicals through the main line in the required appropriate concentrations would make the cost prohibitively high due to the large internal volume of the main line. Applying the chemicals through the main line in the appropriate amount per unit area would dilute them beyond their effective concentration, resulting in little or no benefit to crop yield.

Described below with reference to FIG. 6 (and later with reference to FIG. 9) is a device and technique for applying concentrated chemicals using a center-pivot irrigation system. The technique of FIG. 6 uses a separate, dedicated delivery pipe and control system to carry chemicals along the pivot, separate from the water delivery system. Another device and technique (see FIG. 9) uses a tank and sprayer carried along the pivot.

Chemical Application Using Separate Pipe

Figure 6:
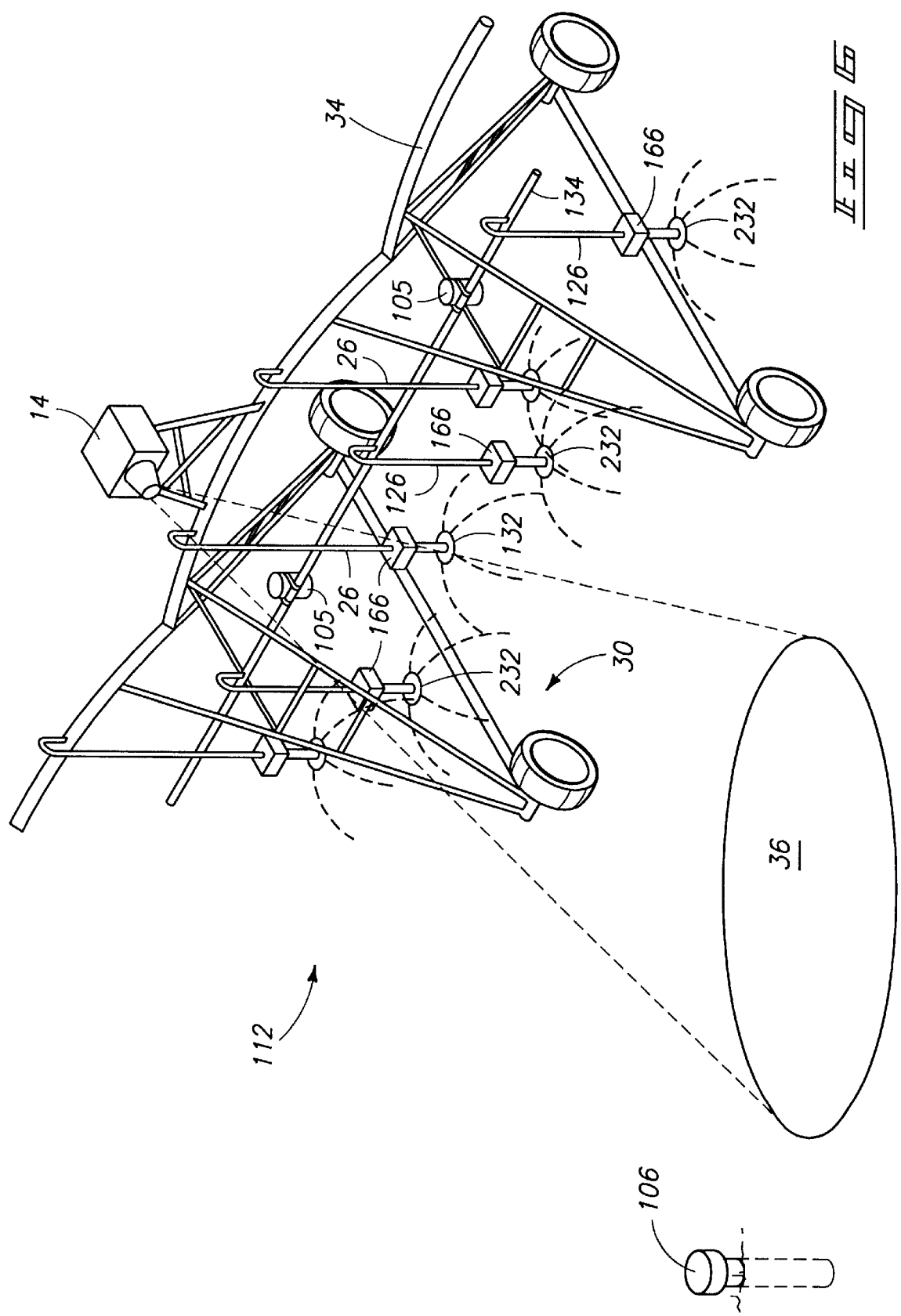
FIG. 6 is an enlarged schematic perspective view of an alternatively constructed sensing apparatus having buried ground sensors and stationary secondary sensors carried at discrete, spaced apart, locations along the irrigation device of FIG. 1, with the additional feature of a primary delivery line and sprinkler system for applying water and a secondary delivery line and sprinkler system for applying concentrated chemicals to an agricultural field.

According to the implementation of FIG. 6, concentrated chemicals are delivered via a separate delivery pipe 134 for delivering fluid chemicals through a plurality of separate nozzles, or sprinklers, 232. Water is delivered through a separate, internal feedline of boom arms 34 via downwardly extending supply lines 26, solenoid valves 166 and sprinklers 132. One or more pumps 105 spaced along delivery pipe 134 maintains fluid pressure within chemical line 134 for proper nozzle operation and to deliver the chemical to each of the nozzles 232. The sizing of the inside diameter of the pipe forming line 134 is a compromise between making it smaller to conserve chemical and making it larger to minimize friction losses to the inner tube walls during pumping.

It is desirable to use all the chemical that is delivered into line 134 in order to get the maximum financial benefit from the chemical, since concentrated chemicals tend to be expensive. Furthermore, it is desirable to minimize the risk of environmental pollution from residual chemical becoming concentrated at one point and leaking onto the ground.

One technique of accomplishing this is to purge line 134 with water after each use. The water could be available from a separate tank or from a line plumbed into the regular irrigation line formed within boom arms 34. For the case where the chemical line 134 has a higher pressure than the irrigation main line 34, it becomes necessary to pump the water from the main line 34 into the chemical line 134 with a dedicated delivery pump (not shown). A check valve (not shown) would also be needed to prevent chemical from leaking into the main line.

Further describing the purging system for use on the FIG. 6 device 112, when a chemical application is completed it is desirable to purge line 134 of chemicals to protect the line and associated equipment from chemical reactions. Otherwise, chemical reactions might deteriorate the equipment or leave a residue that would be hard to remove later, or even create an environmental hazard by its unused presence. One common practice in applying agricultural chemicals is to rinse the original chemical containers and apply that material to the site. All the chemical is used and the containers are clean or at least the risk is minimized.

The array of separate pumps 105 provided along delivery line 134 can be coordinated to optimize fluid delivery. More particularly, each pump 105 can be designed to maintain a target pressure during operation. Additionally, a signal communication line is provided between the pumps. Starting near the pivot point (for example, fixed pivot end 18 of FIG. 1), as the first pump 105 is provided with available fluid chemical it begins pumping the chemical to deliver it to the second pump. Preferably, a fluid pressure sensor (not shown) triggers operation of the pump in response to a detected threshold pressure. When a minimum pressure was achieved, the next, or second, pump 105 will begin pumping, but at a slightly lower rate than the first pump.

The lower rate results because fluid mass flow is reduced directly in proportion to the distance of the pump from the fixed pivot end due to upstream sprinklers releasing fluid. This construction will maintain continuous pump operation and effectively hand off the chemical from the first pump to the second pump, moving the fluid chemical to the third pump and so one. This process is continued all the way to the radial outer end of line 134.

In some cases where chemical would be used in a site specific application and was needed only half way along the length of the pivot 112, pumps 105 beyond that specific point would not be used and they would be disabled, blocking the flow of chemical past the point beyond the first disabled pump. In any case once sufficient pressure was measured at a given pump 105, that pump's control system would shut that pump off.

Furthermore, nozzles 232 are controlled by solenoid valves 166 to allow the nozzles to have zero flow as well as to allow the nozzles to be fully open to spray chemical. This allows the chemical application rate to be adjusted according to the need of a particular location in the field. Furthermore, this prevents chemical from being applied where it should not be applied.

The preferred method of control for pumps 105 is a proportional control in which the fluid pressure of the chemical is monitored during pump operation. Rather than the pump 105 turning off at the moment the threshold pressure is reached, the pump either slows down as the limit is reached or, alternatively (if it can only be on or off), it is on for proportionately shorter amounts of time as the limit is being reached. One goal is to have smooth fluid pressure changes. Another is to minimize wear on pump 105, particularly wear on the electrical contacts.

Chemical delivery pipe 134 is located parallel to the pivot main line 34 and is preferably near the main line since, as the pivot moves, it articulates between adjacent sections. This construction minimizes any changes in length of pipe 134 when the pivot 112 changes angles from an approximately straight line. Some axial expansion capability can be created by adding slightly extra pipe and forming a local deviation from a straight line such as a bump. By creating such bumps at various points along the pipe, flexing of the bumps when axial tension and compression is applied, would accommodate axial changes in length.

Essentially, each bump provides for axial slack which is used up as the pivot pipe changes length during misalignment of the pivot during normal operation. Chemical pipe 134 would be attached to the pivot main line 34 using bands around cross bars on each support tower 30. Alternatively, mounting brackets can be used to attach pipe 134 directly to pipe, or boom arm, 34. Chemical pipe 134 would be light enough that it could support itself over short distances as would occur between two spans, or support towers, 30 of pivot 112.

Preferably, nozzles 232 are different from the nozzles of sprinklers 132 in that smaller amounts of liquid would be applied per unit area. However, sprinklers 132 can be substituted for nozzles 232.

Field In-Ground Sensing

Center pivot irrigation device 112 of FIG. 6 also includes the additional novel features of combined in-ground capacitive sensors 106 and movable sensors 14 carried by the pivot. Currently, in-ground sensors 106 are commercially available under the commercial name of EnviroSCAN, by Sentek PTY LTD, Adelaide, South Australia. Such sensors 106 are buried in the ground at selected locations for continuously monitoring soil moisture content at several depths via discrete capacitive sensor arrays. With the commercially available product, data from several adjacent sensors is catalogued at a central collection station where it can be reviewed periodically. However, several important improvements are made here in order to allow for large scale, cost effective application in association with a large center pivot irrigation device.

More particularly, data from sensor 106 is collected via underground wires where it is transferred to microcomputer 44 and computer 46 (of FIG. 3) so it can be implemented in association with computerized crop management software programs. Furthermore, implementation of sensors 106 to cover an entire field beneath a large center pivot irrigation device, such as device 112, would prove to be too costly. Therefore, selected locations within a field being cultivated are monitored with sensors 106, with movable sensors 14 being carried across the field by the irrigation device 112.

Combination of movable sensors 14 and in-ground sensors 106 enables computerized interpolation of data in order to estimate the moisture levels at all locations within an agricultural field, while at the same time containing overall cost. Any suitable interpolation algorithm can be used to estimate, or curve fit, data for field moisture levels between sensors 106.

Sensors 14 can be optical cameras used to detect visible field variations indicative of soil moisture variations. Alternatively, sensor 14 can be any sensor capable of detecting soil characteristics relating to soil moisture, etc. Additionally, or alternatively, sensor 14 can be used to measure some other crop or field characteristic that is used in combination with the soil moisture information from sensors 106 to make decisions about how a field should be irrigated with water and/or chemicals.

Figure 7:
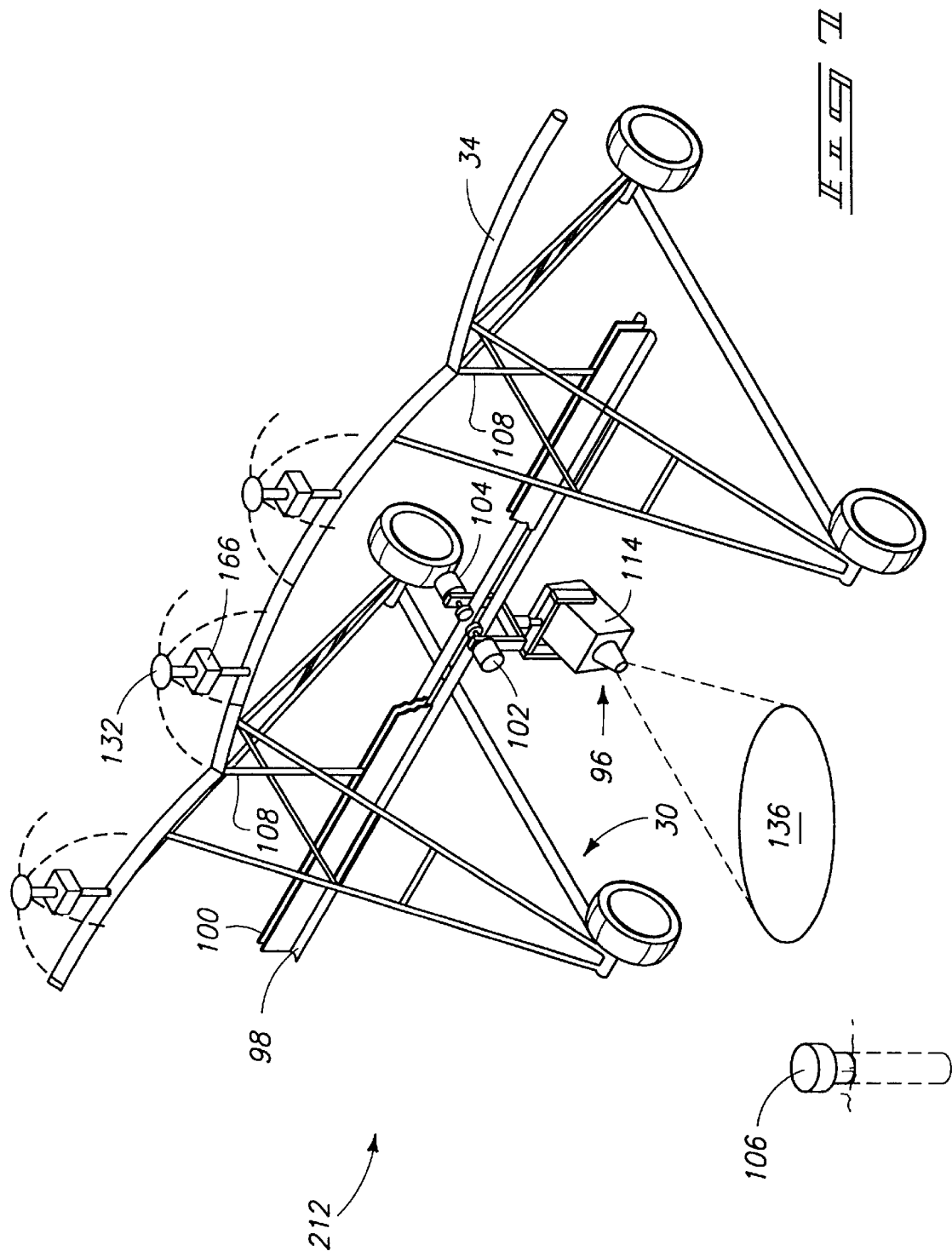
FIG. 7 is an enlarged schematic perspective view of another alternatively constructed remote sensing irrigation apparatus having a combination of buried ground sensors and a movable sensor carried along the irrigation device.

FIG. 7 illustrates another alternative construction for a center pivot irrigation device 212 having fixed in-ground sensors 106 and a movable sensor 114 carried for radial travel by a mobile carrier 96. Details of such a mobile carrier are disclosed in Applicant's co-pending U.S. patent application Ser. No. 08/813,180 filed on Mar. 7, 1997 and entitled, "Mobile Mounted Remote Sensing/Application Apparatus for Interacting With Selected Areas of Interest Within a Field", listing inventors as Gerald J. McNabb and Byron Smith. This Ser. No. 08/813,180 application, which is now U.S. Pat. No. 5,884,224, is hereby incorporated by reference.

Mobile carrier 96 as shown in FIG. 7 is movably carried beneath the longitudinal axis of boom arms 34 on center pivot irrigation device 212. Sensor 114 is movably carried by a mobile carrier 96 that travels on a pair of support tracks 98 and 100 carried by irrigation device 212. Sprinklers 132 and solenoid valves 166 have been mounted to extend upwardly from each boom arm 34 in order to provide an unobstructed longitudinal path for mobile carrier 96. In this manner, mobile carrier 96 can move in a direction perpendicular to the travel direction of irrigation device 212 under its entire length. Mobile carrier 96 supports an optical sensing device 114. Alternatively, carrier 96 can support an application device as described below with reference to FIG. 9. Further alternatively, more than one mobile carrier 96 can be carried on irrigation device 212, each having a sensing and/or application device, either on one common pair of support tracks 98 and 100, or on separate pairs of tracks.

According to FIG. 7, support tracks 98 and 100 are suspended beneath boom arms 34 from hanger supports 108. A hanger support 108 depends from each pair of adjacent boom arms 34 where they attach together at a support tower 30. In this manner, tracks 98 and 100 cooperate to form a mechanical support for hanging mobile carrier 96. Additionally, support tracks 98 and 100 are electrified in order to supply operating power to mobile carrier 96. A pair of servo drive motors 102 and 140 on carrier 96 move carrier 96 to desired accurate axial positions along irrigation device 212 according to computer implemented control commands that are conveyed as superposed signals atop the electrical power being supplied over tracks 98 and 100. Preferably, a computer having a geographic information system (GIS) stores data and initiates control commands. Accordingly, sensing device 114 can accurately detect field conditions within a specific area of interest 136 within a field.

Figure 8:
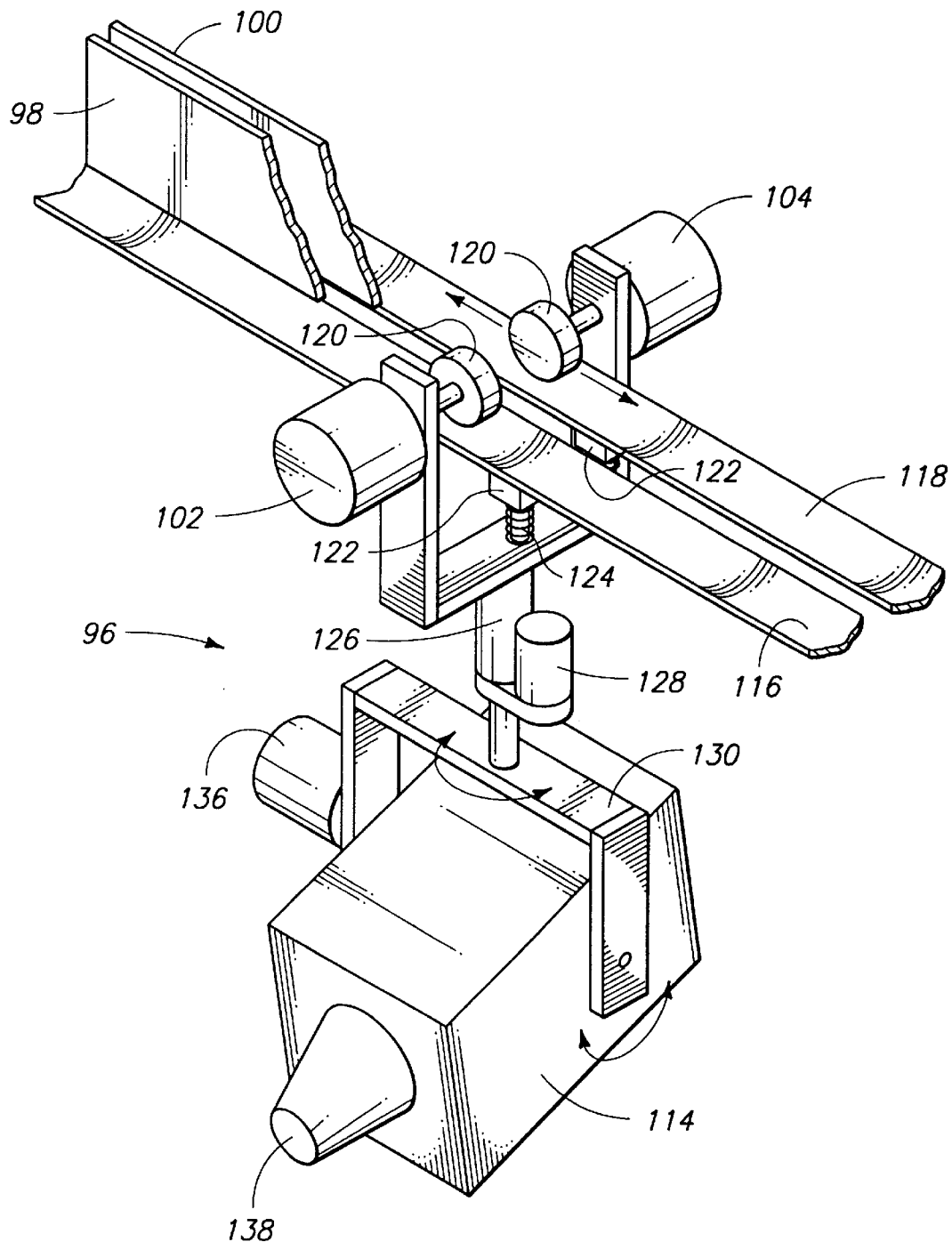
FIG. 8 is a further enlarged schematic perspective view of the sensing apparatus of FIG. 7.

FIG. 8 depicts in enlarged detail the construction of mobile carrier 96. An input interface in the form of an optical lens 138 is movably supported in relation to tracks 98 and 100 by mobile carrier 96. Lens 138, which forms an end effector of sensing device 114, is rotatably supported about two perpendicular axes via servo actuated motor drives 128 and 136. Preferably, lens 138 is a camera lens of an optical detection camera. Alternatively, a spray nozzle of a chemical applicator can be provided on mobile carrier 96. Drives 128 and 136 enable adjustment of line-of-sight targeting within a field, enabling an accurate determination of the location of area of interest 136 (of FIG. 7) within a field. Additionally, motion of an irrigation device (such as device 212 of FIG. 7) in combination with movement of mobile carrier 96 enables lens 138 to be accurately aligned via a computer with any desired area of interest within a field.

More particularly, mobile carrier 96 supports sensing device 114 via a pair of support yokes 126 and 130. Yoke 126 carries motors 102 and 104 along an open u-shaped end. Alternatively, a single motor can be used to drive carrier 96. An opposite end of yoke 126 is rotatably connected with a similar end of yoke 130 via servo actuated motor drive 128. Drive 128 includes intermeshing gears which rotatably position yokes 126 and 130 with respect to one another in response to computer control commands that are received as superposed signals over electrified tracks 98 and 100. Similarly, a servo actuated motor drive 136 rotatably positions sensing device 114 with respect to yoke 130. Drive 136 also receives computer control commands via superposed signals over electrified tracks 98 and 100. Preferably, motor drives 102, 104, 128 and 136 are each responsive to a different frequency signal, enabling transmission of distinct control commands for each drive via a control computer by superposing each frequency signal over electrified tracks 98 and 100. Alternatively, the motors can use the same frequency for communication on a network, but have different addresses. Each motor then is turned on or off according to computer command by multiplexing the signals. In this manner, a payload carried on sensing device 114 on carrier 96 can be rotated with two separate degrees of freedom, with up to 360 degrees of rotation about each axis.

As shown in FIG. 8, a pair of electrical brushes 122 maintain constant electrical contact via springs 124, between components of mobile carrier 96 and tracks 98 and 100. A brush 122 is maintained in spring biased contact with each track 98 and 100 while carrier 96 moves along tracks 98 and 100. Preferably, each brush 122 maintains contact with track 98 and 100 along a bottom surface, since the bottom surface tends to present a cleaner surface than the top surface because it does not collect dirt, grime, and fertilizer products. Brushes 122 supply power to the motors of servo motor drives 102, 104, 128 and 136, as well as supply superposed control signals for directing operation of each respective motor to enable computer controlled positioning of lens 138 to a desired line-of-sight over an agricultural field.

Preferably, wheels 120 support carrier 96 along tracks 98 and 100. Preferably, each wheel 120 has an outer contact surface that accurately maintains rolling contact with one of tracks 98 and 100, preventing slippage that would make tracking of the position of carrier 96 along tracks 98 and 100 difficult and inaccurate. In one version, wheels 120 can have a gear face that intermeshes with a linear gear rack on tracks 98 and 100. Alternatively, wheels 120 can have a friction coating, with tracks 98 and 100 receiving a similar coating. Even further, a separate position determining device, such as a global positioning system (GPS) receiver or any telemetry device can be used to accurately monitor the position of carrier 96 along tracks 98 and 100. Another technique would utilize detectable markers being placed along tracks 98 and 100, with sensors being carried by carrier 96 to detect position of carrier 98 along tracks 98 and 100. For example, an inductive pickup can be used to detect magnetic markers on tracks 98 and 100. Alternatively, any of a number of reluctance, optical or linear position detecting devices can be used.

According to the construction of FIG. 8, preferably, motor drives 102 and 104 each include a 24 Volt DC motor that drives carrier 96 along a pivot irrigation device. Brushes 122 pick up the voltage from electrical tracks 98 and 100 to drive wheels 120. Optionally, four wheels can be used to carry carrier 96 along tracks 98 and 100 to better stabilize carrier 96. Preferably, separate sections of tracks 98 and 100 are carried by each pivot span making up a pivot irrigation device, with a short piece of track laying over adjacent sections to form a continuous electrically conductive track beneath the entire pivot device. Such provides electrical continuity for brushes 122.

Pursuant to the above described construction of FIGS. 7 and 8, mobile carrier 96 enables movement of input sensor interface, or lens, 138 to align with a desired area of interest within a field due to 360 degree motion along the horizontal and vertical axes, along with movement along tracks 98 and 100. A moving irrigation device 212 supporting carrier 96 enables precise transportation and placement over any area of interest on a field being cultivated via computer controlled positioning. Initially, carrier 96 can collect sensor data about the field being cultivated. For example, a camera could be transported along the full length of the irrigation device near the main line pipe (see boom arms 34 of FIG. 7). Tracks 98 and 100 can be mounted to carry device 114 above, below or fore/aft of the main line pipe. Communication information from a computer, superposed over supply power on electrified tracks 98 and 100, could include motor control information directing interface, or lens, 138 on where to go, what direction to aim, etc. Additionally, collected data could be transported back to the control computer on the irrigation device via superposed signals on tracks 98 and 100, where it is monitored and stored.

Figure 9:
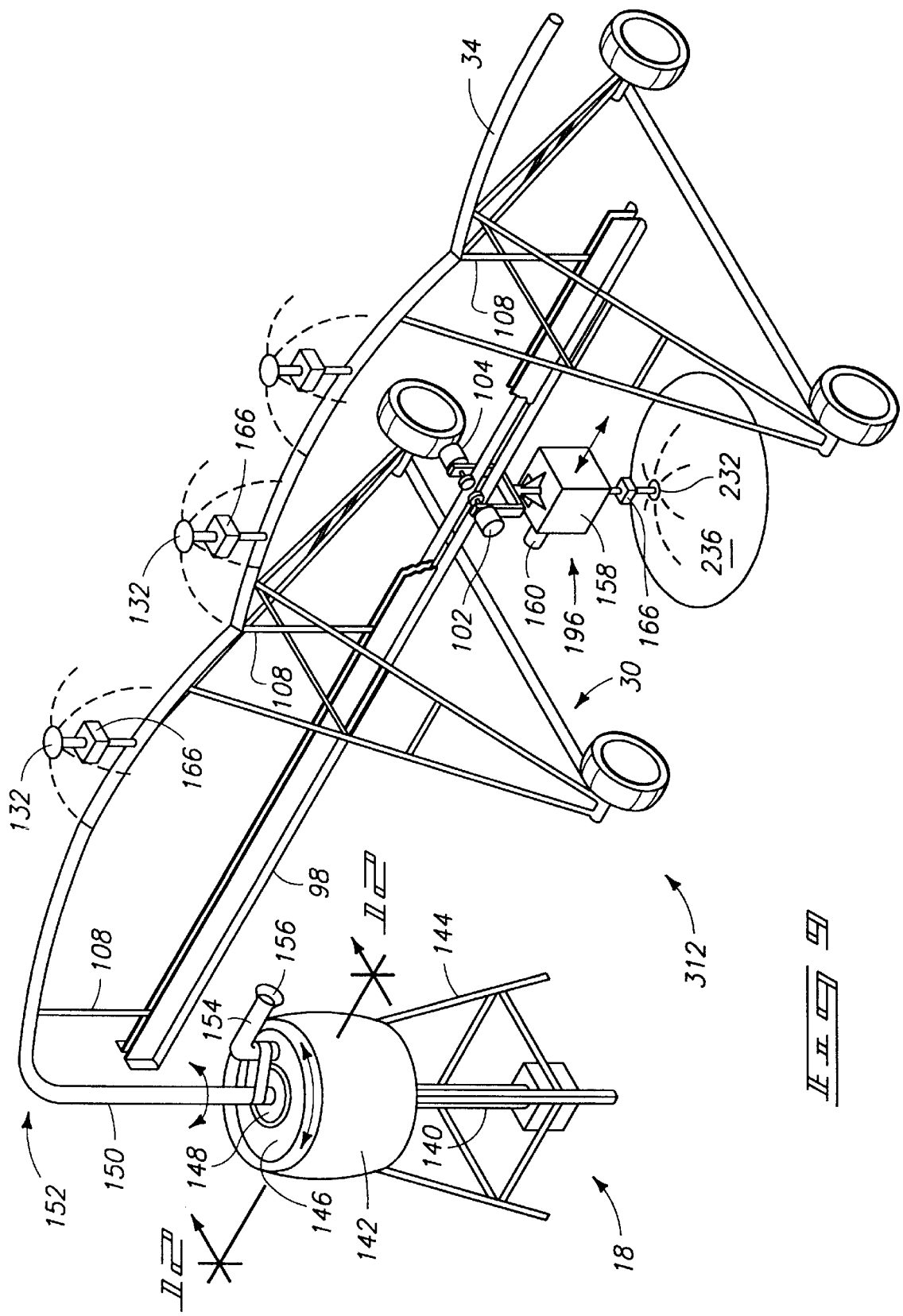
FIG. 9 is an enlarged schematic perspective view of a fourth alternatively constructed fluent applicator apparatus movably carried along the irrigation device of FIG. 1.

Mobile Chemical Applicator Using Portable Tank and Nozzle and Chemical Reservoir Tank at the Pivot Point An alternative technique for applying fluid chemicals to a field uses a mobile tank 158, a pump 162 (FIG. 11), and a nozzle 232, referred to collectively as a "portable sprayer", which travels along the length of the pipe to apply chemicals, as shown in FIG. 9. One or more rails 98, 100 are attached to the pivot main line to allow the movable spraying device 196 to be positioned either below or above the main line 34. Rails 98 and 100 physically support the weight of movable device 196. Power is obtained from 480 VAC power which is available along the length of the pivot 312 via rails 98 and 100. Power supplies (not shown) positioned periodically along pivot 312 reduce the voltage for safety reasons and supply voltage to rails 98 and 100.

In operation the sprayer device 196 travels along pivot 312 to the location where the chemical reservoir tank 142 is located. This is typically at the pivot point along fixed pivot end 18. An inlet tube 102 docks with the reservoir tank 142 at a coupling throat 156 for the purpose of transferring fluid chemical. The chemical is typically premixed to simplify the process. Once it has filled portable tank 158 it traverses the pivot as needed to apply fluid chemical to the field.

This technique can be used to apply fluid chemical uniformly to the entire field or can be used in conjunction with a variable rate control system to apply varying amounts of fluid chemical based upon the needs for each of many management zones within an agricultural field. A map of the field is used to identify the need for chemical, and is stored on a computer such as computer 46 (of FIG. 3). The nozzle 232 of movable device 196 (of FIG. 9) can be programmed and controlled to respond to that need. A record is also kept of the chemical application for each management zone. Chemical application is made until the need is satisfied. The chemical requirements are stored as part of the map for each management zone, and control the amount of chemical that is applied. The record of application can be transferred to other computers (such as computer 44 of FIG. 3) and can be used to help satisfy projected/estimated needs, to report the application amounts, and can also be used by the grower or an advisor in making crop and soil management decisions.

The mobile device 196 is able to communicate with other control systems on pivot 312 for purposes of coordinating application activities, reporting application amounts, and reporting failures. An example of coordination would be for the sprayer to request certain irrigation nozzles be turned off so that a chemical spray application can be made to an area of common coverage. The benefit in turning off the irrigation water would be to prevent water from washing off a chemical that had just been applied to plant leaves before the chemical can accomplish its task.

Accordingly, irrigation decisions can be made regarding chemical and/or water application in reliance on the collected data according to the construction depicted in FIG. 9. Hence, a mobile carrier 196, constructed similar to carrier 96 of FIGS. 7 and 8, can be similarly moved to position a chemical applicator in the form of a nozzle 232 and a portable fluid storage tank 158. Mobile carrier 196 provides a movable chemical sprayer, via nozzle 232, that is transported up and down tracks 98 and 100 of a center pivot irrigation device 312. Alternatively, nozzle 232 can be a movable, directional nozzle that enables selective positioning of deposited chemical. Mobile carrier 196 has a transportable tank 158 for applying needed chemicals to accurate locations within a field. Tank 158 is periodically replenished with liquid chemicals located within a central storage tank 142, positioned about fixed pivot end 18.

A servo control valve 166 receives control signals and electrical power via tracks 98 and 100, according to the power and control transmission features disclosed above with reference to the embodiment of FIGS. 7 and 8. Nozzle 232 deposits concentrated liquid chemicals within area of interest 236 of a field, as pivot 312 is rotated over the field and carrier 196 is radially positioned. Water is separately applied via sprinklers 132 and dedicated solenoid valves 166 which are provided along boom arms 34 which supplies the water.

Because center pivot 312 rotates around a main line water supply line 140, a special technique is used to replenish chemical without human intervention. If a hose was hung to the ground to draw chemicals from a source of chemicals, the hose would rotate around the pivot point. If the end were attached at the ground, along line 140, the hose would wrap around the main line and be broken during the normal operation of the pivot. Therefore, a source of chemical is provided along the vertical axis of the pivot. Alternatively, a sealed slip ring connector could be used to supply chemicals to a separate supply line, similar to water slip ring connector 148. Reservoir tank 142 provides a trough for replenishing portable tank 158. Alternatively, reservoir tank 142 provides a supply for a dedicated chemical supply line 254, according to the construction of FIG. 12.

However, a slip ring connector 148 is already occupying the central connector location adjacent tank 142, which would complicate the addition of a second slip ring connector for transferring chemicals. Furthermore, power is also transferred up through slip ring connector 148 to provide power from the pivot point to the rotating pivot. Although a person might combine the functions of electrical, water and chemical "slip rings" in one device, it would be difficult. The agricultural irrigation industry has already established the use of the pivot axis for electrical slip rings. However, another more practical and reliable approach is needed to get the chemicals from the ground to the chemical line along the pivot.

According to the FIG. 9 construction, one technique for providing a fluid chemical supply consists of supporting doughnut-shaped reservoir tank 142 centrally about fixed pivot end 18, immediately below the horizontal portion of the main water line of boom arms 34. A coupling throat on a receiver tube 154 mates and demates with a supply connector tube 160 of tank 158 for resupplying liquid chemical to the portable tank. Centrally locating reservoir tank 142 places the tank out of the path of the rotating boom arm 34. The reservoir in this location does not interfere with any electrical connections. Additionally, or alternatively, multiple reservoirs could be used by placing them one above the other for supplying multiple types of application fluid.

Reservoir tank 142 is shaped as a doughnut having a cross-section generally deviating from a circular shape to be parabolic. This shape allows for more capacity while minimizing the evaporation of chemicals from the surface through the top opening. The reservoir tank 142 also has a rotating lid 146 having sufficient curvature to allow rainwater or irrigation water to run off the top to the ground. Lid 146 serves to minimize evaporation of the liquid chemical and to prevent contamination from getting into the chemical.

The lower portion of reservoir tank 142 is supported by a central framework 144 further operates to strengthen stationary supply line 140. As pivot 312 rotates, the lower (and larger) portion of the reservoir does not move. However, top 146 and supply line receiver tube 154 rotate with boom arms 34. The weight of the liquid chemical is supported by framework 144 about vertical main line 140. The actual shape of the lower portion of reservoir tank 142 can be different than that described above as long as sufficient fluid capacity to supply the demand of the chemical demand of nozzle 232 is met. Alternatively, for the construction of FIG. 12, the supply demand for pump(s) along the pivot is met via dedicated chemical supply line 254 (of FIG. 12). Access to receiver tube 154 is thus provided at any angle of pivot rotation.

Also, reservoir tank 142 does not have to be next to the vertical main line pipe 140 to accomplish its task. Other existing pivot supporting structure may occupy the space next to the fixed pivot end 18. The doughnut-shaped reservoir tank can be constructed to have a "larger doughnut hole". Such a construction will move the chemical transfer process a few inches or feet from the pivot axis point, but the concept and process are the same as if it were in contact, or close association with the vertical pipe 140.

Reservoir tank 142 is filled from a tank (generally sitting on the ground) via a supply pump 172, according to the construction described below with reference to FIG. 11. A pump connected to tank 142 delivers fluid chemical to the reservoir tank on demand as the level of chemical in the reservoir drops.

Provision for draining reservoir tank 142 is also preferably provided. This can be done either by a drain plug (not shown) or allowing chemical to pass back through the pump to the main supply tank (not shown) on the ground.

Figure 10:
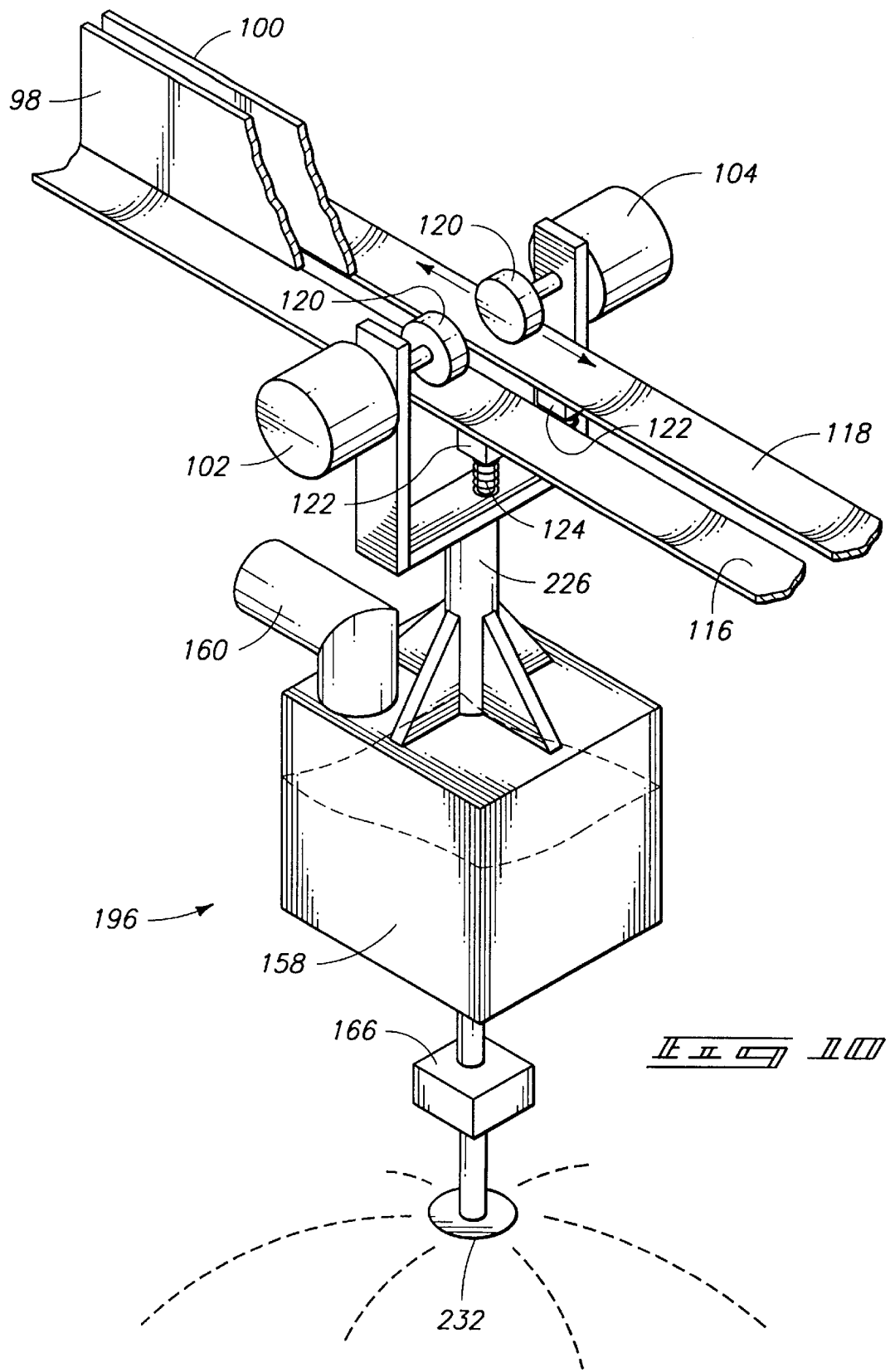
FIG. 10 is a further enlarged schematic perspective view of the fluent application apparatus of FIG. 9.

FIG. 10 illustrates the construction of mobile carrier 196 for distributing fluent agricultural materials such as chemicals, liquid fertilizers, and/or water and water-based combinations. Carrier 196 is constructed according to the construction of carrier 96 of FIGS. 7 and 8, except that tank 158 is affixed to yoke 226 via welded angles. Solenoid valve 166 and nozzle 232 are suspended from beneath tank 158 for distributing fluid chemicals to a field. Connector tube 160 releasably couples with tube 156 (of FIG. 9) for resupplying chemicals to tank 158. Preferably a level sensor (not shown) is provided in tank 158 to determine when tank 158 needs to be replenished. Alternatively, sprinkler 32 and sensor 35 (of FIGS. 2 and 5) can be substituted for nozzle 232 and valve 166 to enable determination of when tank 158 is empty (no fluid flow being detected).

Remaining features on carrier 196 such as tracks 98 and 100, wheels 120, motors 102 and 104, and brushes 122 and springs 124 operate in the same manner as those disclosed in FIG. 8. Accordingly, wheels 120 drive carrier 196 along raceways 116 and 118 of tracks 98 and 100, respectively.

FIG. 11 illustrates the rotating cover features provided by cover 146 seated atop tank 142 via an inner and outer array of tapered roller bearings 147 and 149, respectively. Tank 142, shown in vertical cross section, encircles stationary supply line 140 (and electrical lines housed therein, but not shown). Vertical supply line 150 rotates at coupling 148, along with cover 146 and receiver tube 154. Receiver tube 154 is mounted to cover 146 such that submersible pump 162 and inlet tube 164 are suspended just above the bottom of tank 142. As an irrigation device rotates about line 140, line 150, cover 146, tube 154, pump 162 and inlet 164 also rotate, relative to stationary tank 142. Coupling throat 156 can be readily seen as having a frustoconical shape to facilitate mating with the connector tube 160 (of FIG. 9). A contact switch 168 within tube 154 triggers filling of tank 158 by pump 162 when presence of tube 160 is detected by switch 168. Pump 162 fills tank 158 (see FIG. 10) until a level sensor (not shown) within the portable tank detects a near full state.

Cover 146 is attached to the portion of the horizontal irrigation main line 150 with brackets (not shown) which rotates about the pivot point or would lightly cover the lower portion of the reservoir. Fluid chemical is resupplied to tank 142 periodically from a larger supply tank (not shown) via a supply pipe 176, by just a dedicated supply pipe. Pump 172 delivers chemical via feed line 174 until level sensor 170 detects fluid chemical, triggering pump 172 to be shut off.

Feed line pipe 174 that fills reservoir tank 142 can either pass through the wall of the lower portion of the reservoir tank or it can lay over the upper lip of the lower portion of the reservoir tank. In either case it has access to fill the reservoir tank and does not interfere with the inlet hose receiver tube 154 removing chemical from the reservoir tank. Alternatively, a float valve can be substituted for level sensor 170.

FIG. 12 illustrates an alternative construction for tank 142 of FIG. 11, but with a dedicated receiver tube 254 provided in the form of a dedicated chemical feedline. Tube 254 is then mated at a top end (not shown) to a chemical feedline extending along the irrigation device, such as chemical feedline 134 (of FIG. 6).

Safety Control

In addition to the features disclosed in the embodiments of FIGS. 1–12, a good irrigation system should have a control system which adds "common sense" to its operation. A control system can be configured to balance the fluidic, or fluent, agricultural material supply with the demand to prevent catastrophic failures of the irrigation system. An example of a failure would be overfilling the reservoir tank 142 (of FIG. 9) when the rest of the system is shut down. An optimal control system would do such things as calculate the demand for fluid chemical based on flow measurements in the delivery pipe, time of operation of the pumps on the main line, etc. It would also prevent the supply pump from applying significantly more chemical than was being used by the nozzles or sprayers. At the same time it would prevent the supply and delivery pumps from operating if no fluid chemical were available for delivery. This would prevent the pumps from failing since, in many cases, the fluid chemical, or liquid, being pumped provides cooling for the pump.

Chemical Concentration Detection

An additional feature suitable for implementation on the embodiments of FIGS. 1–12 having a closed-loop chemical application system involves a technique for detecting chemical concentration being applied to a field. One method of determining the chemical concentration being applied is to control the chemical injection flow rate in combination with tracking the total flow through the system. The chemical concentration can then be calculated based on these values. A problem is presented because there are situations in which an injection pump cannot be set to deliver fluid at a specific value or rate. By measuring the actual concentration using a chemical or spectrophotometric detector, the desired value can be used as part of a closed-loop system enabling dynamic adjustment of the chemical pump injection rate. One might use this method with a device such as a specific ion electrode; however, it is unlikely that a specific ion electrode or other similar device could be used to quantitatively determine the varied chemicals going through the pivot. But for some applications, it may suffice.

A UV-visible spectrophotometer can also be used as the detection system. A portion of the aqueous chemical flow could be diverted through a cuvette on a continuous basis to monitor the concentration of the chemicals being applied. This would work for delivery systems that mix water and chemicals prior to their application. Absorption of light at specific wavelengths by the mixture can be measured to calculate concentrations of various chemicals present in the irrigation water. This information can be used as part of a closed-loop control system to control the chemical concentration within a liquid mixture. The information can also be used to monitor when the chemical concentration exceeds acceptable limits.

Pivot Shutdown Cause Detection and Reporting

Center pivots such as those disclosed in the embodiments of FIGS. 1–12 are designed to operate with the towers and corresponding spans spaced along an approximately straight line. Deviation from a straight line of any tower which exceeds a predetermined design limit can cause failure of the system. As a result, pivot manufacturers have designed a mechanism located in each tower which shuts the pivot down when this limit is exceeded. When pivot misalignment exceeds the shutdown limit, a switch is closed which sends a signal to the control box. The control box shuts the pivot down until maintenance people can correct the problem, align the pivot, and restart the pivot.

However, this current method has several problems. First, the grower is not alerted to the presence of a problem. Secondly, the grower does not know how long the pivot has been down, which creates a problem of how to manage the water. Thirdly, the maintenance people do not know which tower caused the pivot to shut down.

As a solution to these problems, the presence of shutdown signals can be monitored, the shutdown signals being used by the pivot to shut itself down. The system will then record and report the event, identifying the time and the tower that initiated the shutdown. Such a system will save time for a grower by giving an immediate response and by directing maintenance people directly to the source of a problem.

Pivot Communication Over the Internet

Center pivot irrigation devices (pivots) are located over a very wide geographical area. Providing control and data transfer between one or more pivot irrigation devices and various service providers can be a daunting task.

One method is to connect each pivot to the Internet and enable certain individuals to gain Internet access to the pivots via proper security access. Software running on each pivot (such as available from emWare [801/256-3883] of Salt Lake City), along with telephone or radio links to an Internet service provider, will allow bi-directional data transfer between the pivot and the pivot's technical service provider. Local or regional computers with large non-volatile data storage would accumulate data from several pivots and serve as a source to other computers via the Internet. One alternative would be to connect each pivot directly to the Internet. The grower or crop advisor would have access to what is happening at the pivot via the Internet. Field maps which control the pivot could be transferred via the Internet. Emergency situations could be reported via the Internet, etc. Direct manual control of the pivot could also be effected via the Internet by users having password-protected access.

Specific Algorithm for Determining Plant Moisture Response

The EnviroSCAN system discussed with reference to sensor 106 (of FIG. 6) uses an electronic method to measure soil moisture content in soil. It is sufficiently sensitive to measure crop water use during the day and the lack of crop growth at night. Over several contiguous days' time a stair step soil moisture pattern is recorded by the system. A specific algorithm is described below which allows a computer to process the collected data and use the results as part of a closed-loop control system, thereby further improving the embodiments previously disclosed in FIGS. 1–12.

There are three general types of events which are observed to occur over a finite period of time as part of the EnviroSCAN sensor data:

1. Increasing the soil water content from irrigation;
2. Decreasing the soil water content by crop water use;
3. Maintaining the soil water content when plants are dormant.

A. One Exemplary Use of an Algorithm

An exemplary algorithm has several different parts. One part has to do with identifying plant activity. There, the focus is on the plant, not the soil. There are traditional ways of thinking of soil and soil moisture content. The focus is to let the plant tell us what its needs are rather than defining the ideal soil.

1. Plant Moisture Tolerance Limits
   a. Assume that a healthy plant uses water when it is active.
   b. Assume that a plant is active in relation to the sunshine it receives.
   c. For each day, record soil water content at two times: sunrise and sunset.
   d. Calculate plant water usage for the day by subtracting sunset water from sunrise water.
   e. Calculate non-plant water loss for the day by subtracting tomorrow's sunrise water from today's sunset water.
   f. Divide plant water usage by non-plant loss, called activity. Ratios greater than 1 (probably somewhat higher) are a measure of plant activity.
   g. For a wide range of soil moisture contents, a graph is created with soil moisture content on the X-axis and activity on the Y-axis.
   h. The points where the Y-values go to zero are the minimum and maximum limits for soil moisture for that plant in that soil.
2. Soil Moisture Management Limits
   a. Choose an activity (Y-value) above zero at the minimum plant activity level. The corresponding X-values are the limits of soil moisture content that the crop advisor (computer program) will use to manage that field, referred to as the "moisture range".
   b. Identify the amount of water (in inches) to be provided by an irrigation to maintain the moisture within the moisture range. This amount then determines sprinkler/nozzle output (for a constant flow) and rotational rate of the pivot to apply the water.
   c. Identify the lag time in hours or days from the time you choose to irrigate to the time that the pivot can get to that point to apply the water, referred to as the "lead time".
   d. Go back to the graph. Move backward in time on the graph from the right end of the moisture range by the lead time. That is the irrigation "trigger time". That time is the latest time you could request an irrigation and have the pivot satisfy the need prior to when the soil moisture level will drop below the lower limit of the "moisture range".
   e. From the trigger time identified in the previous step, identify from the graph the "trigger moisture" which corresponds to the trigger time. This is the moisture level monitored by the crop advisor program which triggers a request for irrigation. Whenever the moisture level drops below this amount, the crop advisor will initiate an irrigation.

B. Another Use of an Algorithm

1. Another part of the algorithm monitors the upper limit of the "moisture range". If the application of water exceeds this limit, a plant will be injured. This forms another part of the closed-loop circuit.

2. If the upper limit is exceeded by irrigating (we need to verify it is not caused by rain), a warning is reported requesting human intervention.

3. If the upper limit is exceeded by irrigating, the amount of water per irrigation is reduced in a proportional way. For example, the amount of water mistakenly added in excess is divided by the total amount of water applied. The amount of water determined in part 2 of the previous section is multiplied by this fraction and becomes the best guess for the amount of water needed.

a. Multiple Sensor Depths
      (1) It is assumed that the plant roots provide the only means by which water is taken up by the plant. Another part of the algorithm monitors the depth at which plant root activity is occurring. Through the season, water uptake may change to a deeper part of the root zone.
      (2) With sensors at different levels, the algorithm performs calculations at each available level to determine which level is producing the most pronounced soil moisture level changes due to plant water uptake. Decisions are then made using that sensor depth. All depths are in continual competition, each vying to be used in the calculations.
   b. Multiple Soil Types
      (1) One other part of the pivot control algorithm considers that there is more than one type of soil in the field. Since the irrigation system is not perfect, one soil area (for example, soil area (B)) may be irrigated as a matter of efficiency because its neighboring soil type (for example, soil type (A)) was irrigated. A record is made of this area being irrigated.
      (2) The added complexity is that when its soil type (B) later requests an irrigation operation, the system may pass over this area (B), because it was irrigated with the lighter soil (A) (the one requesting the previous irrigation). As an alternative, the soil type (B) may receive a lighter irrigation as part of the second pass.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An automatic irrigation system comprising:
   a movable irrigation device having a fluid delivery nozzle and a fluid manifold positioned along the movable irrigation device and adapted to receive irrigation fluid from a supply source;
   a detector of moisture present within an agricultural field including an output on which signals representing detected moisture level are placed;
   an electronic storage device having an addressing and reproduction unit that can selectively address and reproduce a plurality of stored command control signals;
   first electronic circuitry coupled to the storage device and including an input for command control signals reproduced from the storage device, the electronic circuitry applying the reproduced command control signal to cause the detector to detect moisture from a plurality of different locations within an agricultural field; and
   second electronic circuitry for comparing the detected moisture level at each location within the agricultural field with the reproduced command control signals to ascertain whether the moisture level matches the moisture level indicated by the command control signals;

one of the first and the second electronic circuitry producing signals for controlling the fluid nozzle in response to the feedback signal from the detector to impart a desired application of irrigation fluid to the agricultural field.

2. The automatic irrigation system of claim 1 wherein the first electronic circuitry comprises a computer having a processor and a memory.

3. The automatic irrigation system of claim 1 wherein the fluid manifold comprises an elongated feedline carried by the irrigation device for delivering fluent agricultural material to areas of interest within an agricultural field responsive to detected need.

4. The automatic irrigation system of claim 1 wherein the electronic storage device comprises a computer memory.

5. The automatic irrigation system of claim 1 wherein the detector comprises an in-ground sensor signal that is coupled with the first electronic circuitry.

6. The automatic irrigation system of claim 1 wherein the detector comprises a stationary, in-ground sensor, the system further comprising a movable sensor carried on the irrigation device.

7. The automatic irrigation system of claim 1 wherein the movable irrigation device comprises a center pivot irrigation device, and further comprising a supply source in the form of a stationary reservoir tank associated with a fixed pivot end of the center pivot irrigation device.

8. The automatic irrigation system of claim 7 further comprising a mobile fluid applicator carried by the irrigation device for movement radially of the irrigation device.

9. An apparatus for the automatic irrigation of a field comprising:
   a movable irrigation device having a supply of fluent agricultural material, an elongated fluid flow conduit, and a delivery nozzle for distributing the fluent agricultural material to an agricultural field;
   a sensor supported on the movable irrigation device and configurable to detect field conditions within areas of interest on the agricultural field;
   a detector of moisture present within soil of the agricultural field and including an output on which signals representing detected soil moisture are placed; and
   a controller coupled to the detector and the sensor and including electronic circuitry that applies the detected output from the detector and a detected field condition from the sensor to cause the fluid delivery nozzle to release the fluent agricultural material in response to detected needs on areas of interest of the agricultural field.

10. The automatic irrigation apparatus of claim 19 wherein the controller comprises an agricultural irrigation computer.

11. The automatic irrigation apparatus of claim 19 wherein the electronic circuitry comprises memory.

12. The automatic irrigation apparatus of claim 9 wherein the detector comprises at least one in-ground moisture sensor and the sensor comprises a field condition sensor carried by the irrigation device for movement over the field.

13. The automatic irrigation apparatus of claim 22 wherein the field condition sensor detects field conditions indicative of soil moisture content, the controller operative to interpolate soil moisture content for areas of the field disposed from the in-ground moisture sensor by combining detected signals from the at least one in-ground moisture sensor and the movable field conditions sensor.

14. An automatic field irrigation apparatus, comprising:
   a movable irrigation device having a delivery system for delivering a supply of fluent agricultural material to an agricultural field;
   a sensor supported by the movable irrigation device and configured to detect field conditions within areas of interest on the agricultural field;
   a detector of moisture associated with plants growing within the agricultural field and including an output on which signals representing the detected soil moisture are placed; and
   a controller coupled to the detector and the sensor and including electronic circuitry that applies the detected output from the detector and the detected field conditions from the sensor to cause the fluid delivery system to release the fluent agricultural material in response to detected needs on areas of interest of the agricultural field.

15. The apparatus of claim 14 wherein the sensor comprises an imaging camera configured to detect electromagnetic radiation comprising light emanating from plants present within the agricultural field.

16. The apparatus of claim 15 wherein the imaging camera is operative to measure electromagnetic frequencies, including one or more of ultraviolet, visible, and infrared frequencies.

17. The apparatus of claim 14 wherein the sensor is configured to detect electromagnetic radiation emanating from plants within the agricultural field, and wherein selected frequencies of the electromagnetic radiation indicate whether or not plants within the field are receiving excessive fluent agricultural nourishment.

18. The apparatus of claim 14 wherein the sensor is configured to detect electromagnetic radiation emanating from plants within the agricultural field, and wherein selected frequencies of the electromagnetic radiation indicate whether or not plants within the agricultural field are receiving sufficient fluent agricultural nourishment.

19. The apparatus of claim 18 wherein the selected frequencies indicate status levels of soil-based nutrients such as nitrogen.

20. The apparatus of claim 18 wherein the selected frequencies indicate relative health and/or performance of plants present within the agricultural field that are affected by disease or pests.

21. The apparatus of claim 14 wherein the sensor is provided in physical association with one or more plants present within the agricultural field.

22. The apparatus of claim 14 wherein the detector is an in-ground sensor buried in the ground at a selected location to monitor soil moisture content.

23. An automatic field irrigation apparatus, comprising:
   a movable irrigation device operative to deliver a supply of fluent agricultural material to an agricultural field;
   a sensor positioned within the agricultural field and configurable to detect field conditions within areas of interest on the agricultural field;
   a detector associated with plants growing within the agricultural field and including an output on which signals representing a plant condition indicating the amount of moisture present in the plant are placed; and
   electronic circuitry coupled to the detector and the sensor, configured to receive the output from the detector and a detected field condition from the sensor, and configured to cause the irrigation device to release the fluent agricultural material in response to detected needs on areas of interest of the agricultural field.

24. The apparatus of claim 23 wherein the sensor is physically associated with plants present within the agricultural field.

25. The apparatus of claim 23 wherein the movable irrigation device comprises a center pivot irrigation device.

26. The apparatus of claim 25 further comprising a mobile fluid applicator carried by the center pivot irrigation device and movable radially of the irrigation device.

27. The apparatus of claim 23 wherein the sensor is operative to detect light emanating from plants within the agricultural field.

* * * * *

UNITED STATES PATENT AND TRADEMARK OFFICE
CERTIFICATE OF CORRECTION

PATENT NO. : 5,927,603
DATED : July 27, 1999
INVENTOR(S) : Gerald J. McNabb

It is certified that error appears in the above-identified patent and that said Letters Patent is hereby corrected as shown below:

Col. 3, line 35: Delete "delivered to such", and insert --applied to--.

Col. 6, line 26: Delete "along side", and insert --alongside--.

Col. 8, line 46: Delete "being provide", and insert --being provided--.

Col. 9, line 56: Delete "outside work," and insert --outside world,--.

Col. 15, line 18: Delete "nozzle body 66," and insert --nozzle body 62,--.

Col. 16, line 5: Delete "well know spring", and insert --well-known spring--.

Col. 18, lines 7-8: Delete "was achieved", and insert --is achieved--.

Col. 21, line 25: Delete "position of carrier 98", and insert --position of carrier 96--.

Col. 22, line 14: Delete "inlet tube 102", and insert --inlet tube 160--.

Col. 23, line 57: After "framework 144", insert --which--.

UNITED STATES PATENT AND TRADEMARK OFFICE
CERTIFICATE OF CORRECTION

PATENT NO. : 5,927,603
DATED : July 27, 1999
INVENTOR(S) : Gerald J. McNabb

It is certified that error appears in the above-identified patent and that said Letters Patent is hereby corrected as shown below:

In the Claims:

Col. 29, line 48, claim 10: Delete "apparatus of claim 19", and insert --apparatus of claim 9--.

Col. 29, line 51, claim 11: Delete "apparatus of claim 19", and insert --apparatus of claim 9--.

Signed and Sealed this

Twenty-first Day of March, 2000

Attest:

Q. TODD DICKINSON

Attesting Officer

Commissioner of Patents and Trademarks